United States Patent
Alfieri et al.

(10) Patent No.: US 7,324,547 B1
(45) Date of Patent: Jan. 29, 2008

(54) INTERNET PROTOCOL (IP) ROUTER RESIDING IN A PROCESSOR CHIPSET

(75) Inventors: Robert A. Alfieri, Chapel Hill, NC (US); Gary D. Hicok, Mesa, AZ (US); Paul J. Sidenblad, Cupertino, CA (US); Mark A. Parris, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1104 days.

(21) Appl. No.: 10/319,780

(22) Filed: Dec. 13, 2002

(51) Int. Cl.
*H04L 12/66* (2006.01)

(52) U.S. Cl. .................. 370/461; 370/463; 370/412; 370/419

(58) Field of Classification Search ............... 370/461, 370/413, 416, 415, 414, 418, 417, 395.5; 710/20
See application file for complete search history.

(56) References Cited

U.S. PATENT DOCUMENTS

| | | | |
|---|---|---|---|
| 5,802,287 A * | 9/1998 | Rostoker et al. | 370/395.5 |
| 5,937,169 A | 8/1999 | Connery et al. | |
| 6,034,963 A | 3/2000 | Minami et al. | |
| 6,081,527 A * | 6/2000 | Chappel et al. | 370/394 |
| 6,226,680 B1 | 5/2001 | Boucher et al. | |
| 6,247,060 B1 | 6/2001 | Boucher et al. | |
| 6,330,659 B1 | 12/2001 | Poff et al. | |
| 6,334,153 B2 | 12/2001 | Boucher et al. | |
| 6,389,479 B1 | 5/2002 | Boucher et al. | |
| 6,393,487 B2 | 5/2002 | Boucher et al. | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,470,415 B1 | 10/2002 | Starr et al. | |
| 6,487,212 B1 * | 11/2002 | Erimli et al. | 370/413 |
| 6,591,302 B2 | 7/2003 | Boucher et al. | |
| 6,658,480 B2 | 12/2003 | Boucher et al. | |
| 6,687,758 B2 | 2/2004 | Craft et al. | |
| 6,697,868 B2 | 2/2004 | Craft et al. | |
| 6,714,553 B1 * | 3/2004 | Poole et al. | 370/412 |
| 6,751,665 B2 | 6/2004 | Philbrick et al. | |
| 6,757,746 B2 | 6/2004 | Boucher et al. | |
| 6,938,092 B2 | 8/2005 | Burns | |
| 6,941,386 B2 | 9/2005 | Craft et al. | |
| 6,965,941 B2 | 11/2005 | Boucher et al. | |
| 6,996,070 B2 | 2/2006 | Starr et al. | |
| 7,042,898 B2 | 5/2006 | Blightman et al. | |
| 7,089,326 B2 | 8/2006 | Boucher et al. | |
| 7,093,099 B2 | 8/2006 | Bodas et al. | |
| 2001/0021949 A1 | 9/2001 | Blightman et al. | |
| 2001/0023460 A1 | 9/2001 | Boucher et al. | |

(Continued)

FOREIGN PATENT DOCUMENTS

WO  WO 9922306 A1  5/1999

(Continued)

*Primary Examiner*—Doris H. To
*Assistant Examiner*—Ian N. Moore
(74) *Attorney, Agent, or Firm*—Patterson & Sheridan, LLP

(57) ABSTRACT

A novel network architecture that integrates the functions of an internet protocol (IP) router into a network processing unit (NPU) that resides in a host computer's chipset such that the host computer's resources are perceived as separate network appliances. The NPU appears logically separate from the host computer even though, in one embodiment, it is sharing the same chip.

28 Claims, 19 Drawing Sheets

U.S. PATENT DOCUMENTS

| | | |
|---|---|---|
| 2001/0027496 A1 | 10/2001 | Boucher et al. |
| 2001/0036196 A1 | 11/2001 | Blightman et al. |
| 2001/0037397 A1 | 11/2001 | Boucher et al. |
| 2001/0037408 A1 | 11/2001 | Philbrick et al. |
| 2001/0047433 A1 | 11/2001 | Boucher et al. |
| 2002/0087732 A1 | 7/2002 | Boucher et al. |
| 2002/0091844 A1 | 7/2002 | Craft et al. |
| 2002/0095519 A1 | 7/2002 | Philbrick et al. |
| 2002/0147839 A1 | 10/2002 | Boucher et al. |
| 2002/0156927 A1 | 10/2002 | Boucher et al. |
| 2002/0161919 A1 | 10/2002 | Boucher et al. |
| 2003/0005103 A1* | 1/2003 | Narad et al. ............... 709/223 |
| 2003/0079033 A1 | 4/2003 | Craft et al. |
| 2003/0200284 A1 | 10/2003 | Philbrick et al. |
| 2004/0003126 A1 | 1/2004 | Boucher et al. |
| 2004/0030745 A1 | 2/2004 | Boucher et al. |
| 2004/0054813 A1 | 3/2004 | Boucher et al. |
| 2004/0062245 A1 | 4/2004 | Sharp et al. |
| 2004/0062246 A1 | 4/2004 | Boucher et al. |
| 2004/0064578 A1 | 4/2004 | Boucher et al. |
| 2004/0064589 A1 | 4/2004 | Boucher et al. |
| 2004/0064590 A1 | 4/2004 | Starr et al. |
| 2004/0073703 A1 | 4/2004 | Boucher et al. |
| 2004/0078480 A1 | 4/2004 | Boucher et al. |
| 2004/0100952 A1 | 5/2004 | Boucher et al. |
| 2004/0111535 A1 | 6/2004 | Boucher et al. |
| 2004/0117509 A1 | 6/2004 | Craft et al. |
| 2004/0158640 A1 | 8/2004 | Philbrick et al. |
| 2004/0240435 A1 | 12/2004 | Boucher et al. |
| 2005/0141561 A1 | 6/2005 | Craft et al. |
| 2005/0149632 A1 | 7/2005 | Minami et al. |
| 2005/0160139 A1 | 7/2005 | Boucher et al. |
| 2005/0175003 A1 | 8/2005 | Craft et al. |
| 2005/0188123 A1 | 8/2005 | Chen |
| 2005/0193316 A1 | 9/2005 | Chen |
| 2005/0198198 A1 | 9/2005 | Craft et al. |
| 2005/0204058 A1 | 9/2005 | Philbrick et al. |
| 2005/0278459 A1 | 12/2005 | Boucher et al. |
| 2006/0010238 A1 | 1/2006 | Craft et al. |
| 2006/0168281 A1 | 7/2006 | Starr et al. |

FOREIGN PATENT DOCUMENTS

| | | |
|---|---|---|
| WO | WO 0013091 A1 | 3/2000 |

* cited by examiner

INTERNET PROTOCOL (IP) ROUTER RESIDING IN A PROCESSOR CHIPSET

The present invention relates to a novel network processing unit. More specifically, the present invention integrates the functions of an internet protocol (IP) router into a network processing unit that resides in a host computer's chipset such that the host computer's resources are perceived as separate network appliances.

BACKGROUND OF THE DISCLOSURE

FIG. 1 illustrates traditional internal content sources and data pipes where the data routing function is performed by a host central processing unit (CPU) and its operating system (OS) 110. Namely, the host computer may comprise a number of storage devices 120, a plurality of media engines 130, and a plurality of other devices that are accessible via input/output ports 140, e.g., universal serial bus (USB) and the like. In turn, the host computer may access a network 150 via application programming interfaces (APIs) and a media access controller (MAC).

However, a significant drawback of this data routing architecture is that the host computer's resources or devices are only accessible with the involvement of the host CPU/OS. Typically, accessing the host resources from external computers is either prohibited or it is necessary to request access through the host computer using high-level protocols. If the host CPU/OS is overtaxed, a substantial latency will exist where data flow may be stuck in the OS stacks.

To achieve acceleration of networking functions, a host computer may employ a separate network interface controller (NIC) card that is not integrated into the chipset of the host computer. However, the OS still controls the router and gateway functions, thereby requiring the operating system to be booted and in a fully-operational power state in order to process the packets.

Therefore, a need exists for a novel network processing unit that integrates the functions of an internet protocol (IP) router and resides in a host computer's chipset for accelerating networking functions.

SUMMARY OF THE INVENTION

The present invention is a novel network processing unit. More specifically, the present invention integrates the functions of an internet protocol (IP) router into a network processing unit (NPU) that resides in a host computer's chipset, where the NPU combines both host-side and general router/gateway accelerations. The NPU appears logically separate from the host computer even though, in one embodiment, it is sharing the same chip.

In operation, the host computer has a virtual port (i.e., host MAC) that is in communication with the network processing unit and communicates with the NPU as if it is an external network appliance using standard networking protocols. In one embodiment, abstract command queues called push buffers (PBs) are provided for use with the host's "MAC" connection to the NPU. Push buffers can be used to transmit and receive data frames and can also be configured to accept or produce abstract commands.

Aside from the "host MAC", additional MACs (e.g., 10/100/1000, 802.11, HomePNA) and auxiliary processing units (e.g., XPUs as described below) are attached to the NPU. Packets flow into the NPU from these MACs. The NPU may store them in an on-chip cache or in system memory. Once a data frame has been received successfully from a MAC, the NPU may elect to forward the data frame through its acceleration pipeline.

The NPU pipeline is a novel symmetrical collection of modules, each implementing input and output side processing using shared module resources. The NPU pipeline broadly comprises a MAC Interface (MI) module, a Sequence Processor (SP) module and an Address Translation (AT) module. The MI module in the pipeline serves as an asynchronous boundary between each MAC and the NPU. The Sequence Processor (SP) in the pipeline serves to provide automatic decapsulations, decryption, authentication, and checksums on the input side and similar functions but in reverse order for its output side. Finally, the Address Translation (AT) module implements routing and stateful firewall functions.

In one embodiment, the pipeline modules utilize three levels of caching to take advantage of temporal locality in edge-based routing/gateway scenarios: (a) internal subunit caching of most recently used table entries, (b) a cache of table entries in a generally programmable cache area in the NPU, and (c) the full table in system memory. The combination of caching and hashing reduces latency and trips to system memory. The NPU also utilizes various configurable areas in the manually managed cache and memory to store packets that must be recirculated.

In one embodiment, the NPU may make use of extensive prefetching to hide the latency of accessing system memory. Multiple modules inside the NPU may be performing prefetching (or write-gathering) concurrently. Table entries may be programmed to discard or forward packets to arbitrary MACs and MAC queues (PBs).

In one embodiment, the host computer communicates via the NPU with one or more auxiliary or dedicated processing units that are deployed to perform dedicated tasks. These auxiliary processing units can be part of the host or can be deployed separate from the host to meet different application requirements. For example, some of these auxiliary processing units include, but are not limited to, a graphics processing unit (GPU), an audio processing unit (APU), a video processing unit (VPU), a storage processing unit (SPU), and a physics processing unit (PPU). The present disclosure refers to these auxiliary processing units as XPU, where the "X" is replaced to signify a particular function performed by the processing unit. Finally, the network processing unit itself is an XPU because it can, in addition to routing packets among XPUs, perform various processing accelerations on these packets, such as authentication, encryption, compression, TCP, IPSec/VPN/PPP encapsulation and so on.

One aspect of the present Invention is that the XPUs have logically direct attachments to the NPU which effectively serves as an integrated router, thereby allowing XPUs to be seen as separate network appliances. Since these auxiliary processing units have first-class status in this logical network architecture, they are allowed to communicate with each other or with any external computer (e.g., via another NPU) directly using standard internet protocols such as IP, TCP, UDP and the like without the involvement of the host CPU/OS. Using this novel architecture, the NPU provides both local (or host) access and remote access acceleration in a distributed computing environment.

Furthermore, by virtualizing the remaining resources of the host computer, such as its physical memory, ROM, real-time clocks, interrupts, and the like, the present invention allows a single chipset to provide multiple, virtual host computers with each being attached to this NPU. Each of these virtual computers or virtual hosts may run its own copy of an identical or different operating system, and may communicate with other virtual computers and integrated networked appliances using standard networking protocols. Effectively, the present invention embodies its own hardware-level operating system and graphical user interface (GUI) that reside below the standard host operating system and host computer definition, and allow the computer user to easily configure the network or to switch from one virtual computer to another without changing the standard definition of that host computer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
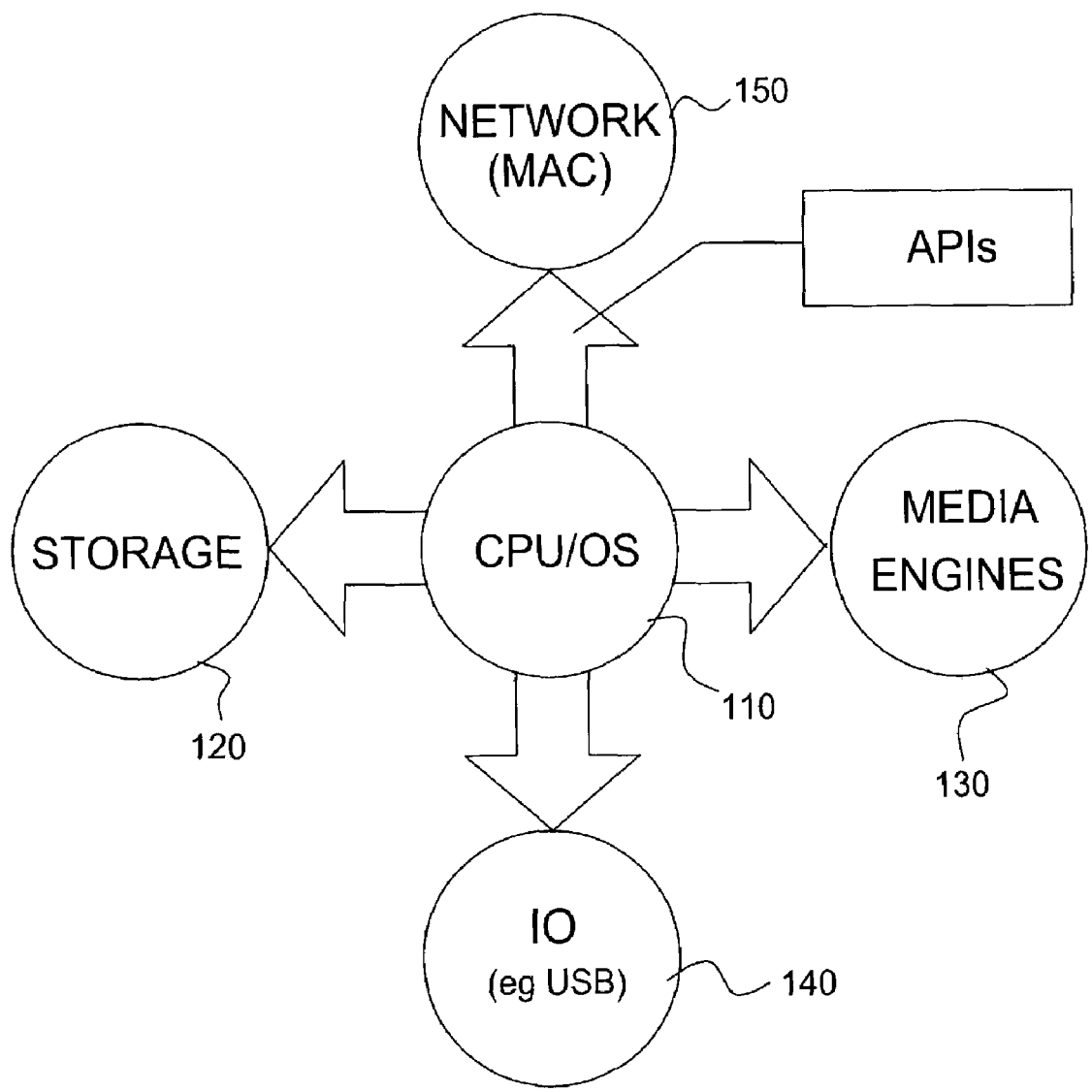
FIG. 1 illustrates a block diagram of conventional internal content sources and data pipes.
Figure 2:
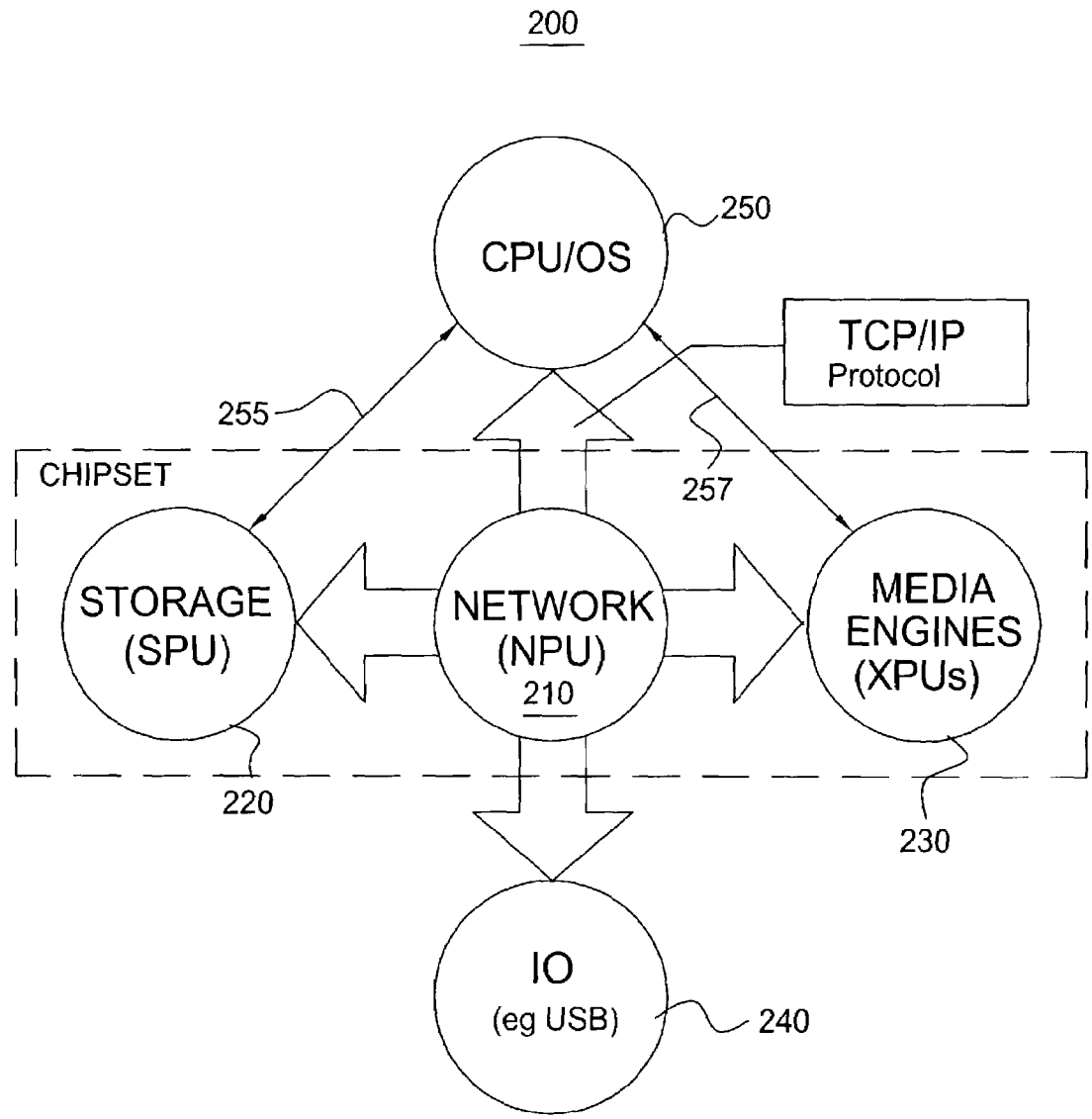
FIG. 2 illustrates a block diagram of novel internal content sources and data pipes of the present invention.

FIG. 2 illustrates a block diagram of novel internal content sources and data pipes 200 of the present invention. Unlike FIG. 1, the present network architecture has a network processing unit 210 of the present invention at the center of the internal content sources and data pipes. The host CPU/OS 250 is no longer central to the data routing scheme. One advantage of this new architecture is that the NPU 210 provides both local or host access and remote access acceleration.

In operation, the host CPU/OS 250 has a virtual port (i.e., host MAC) that is in communication with the network processing unit 210 and communicates with the NPU as if it is an external network appliance using standard networking protocols, e.g., TCP/IP protocols. In one embodiment, the host computer communicates via the NPU with one or more auxiliary or dedicated processing units 220, 230 that are deployed to perform dedicated tasks. These auxiliary processing units can be part of the host or can be deployed separate from the host to meet different application requirements.

For example, some of these auxiliary processing units include, but are not limited to, a graphics processing unit (GPU), an audio processing unit (APU), a video processing unit (VPU), a physics processing unit (PPU) and a storage processing unit (SPU) 220. Some of these auxiliary processing units can be deployed as part of the media engines 230, whereas the SPU 220 is deployed with the storage devices of the host. Finally, the network processing unit itself is an XPU because it can, in addition to routing packets among XPUs, perform various processing accelerations on these packets, such as authentication, encryption, compression, TCP, IPSec/VPN/PPP encapsulation and so on.

In one embodiment, the NPU 210 is a network router appliance that resides inside the same "box" or chassis as the host computer 250, i.e., typically within the same chipset. The NPU serves to connect various other "XPUs" that performed dedicated functions such as:

1) Storage Processing Unit (SPU) is an auxiliary processing unit that implements a file system, where the file system can be accessed locally by the host or remotely via the NPU's connection to the outside world. The SPU is a special XPU because it behaves as an endpoint for data storage. Streams can originate from an SPU file or terminate at an SPU file.

2) Audio Processing Unit (APU) is an auxiliary processing unit that implements audio affects on individual "voices" and mixes them down to a small number of channels. APU also performs encapsulation/decapsulation of audio packets that are transmitted/received over the network via the NPU.

3) Video Processing Unit (VPU) is an auxiliary processing unit that is similar to the APU except that it operates on compressed video packets (e.g., MPEG-2 compressed), either compressing them or uncompressing them. The VPU also performs encapsulations into bitstreams or network video packets.

4) Graphics Processing Unit (GPU) is an auxiliary processing unit that takes graphics primitives and produces (partial) frame buffers. The GPU is a special XPU because it acts as an endpoint for rendered graphics primitives. Streams can terminate at a GPU frame buffer or originate as raw pixels from a frame buffer.

5) Physics Processing Unit (PPU) is an auxiliary processing unit that takes object positions, current velocity vectors, and force equations, and produces new positions, velocity vectors, and collision information.

6) Network Processing Unit (NPU) is itself an XPU because it can, in addition to routing packets among XPUs, perform various processing accelerations on these packets, such as authentication, encryption, compression, TCP, IPSec/VPN/PPP encapsulation and the like.

Some of the above XPUs have a number of commonalities with respect to their association with the host 250 and the NPU 210. First, an XPU can be accessed directly by the host CPU and O/S 250 as a local resource. Communication is effected by using direct local channels.

Figure 3:
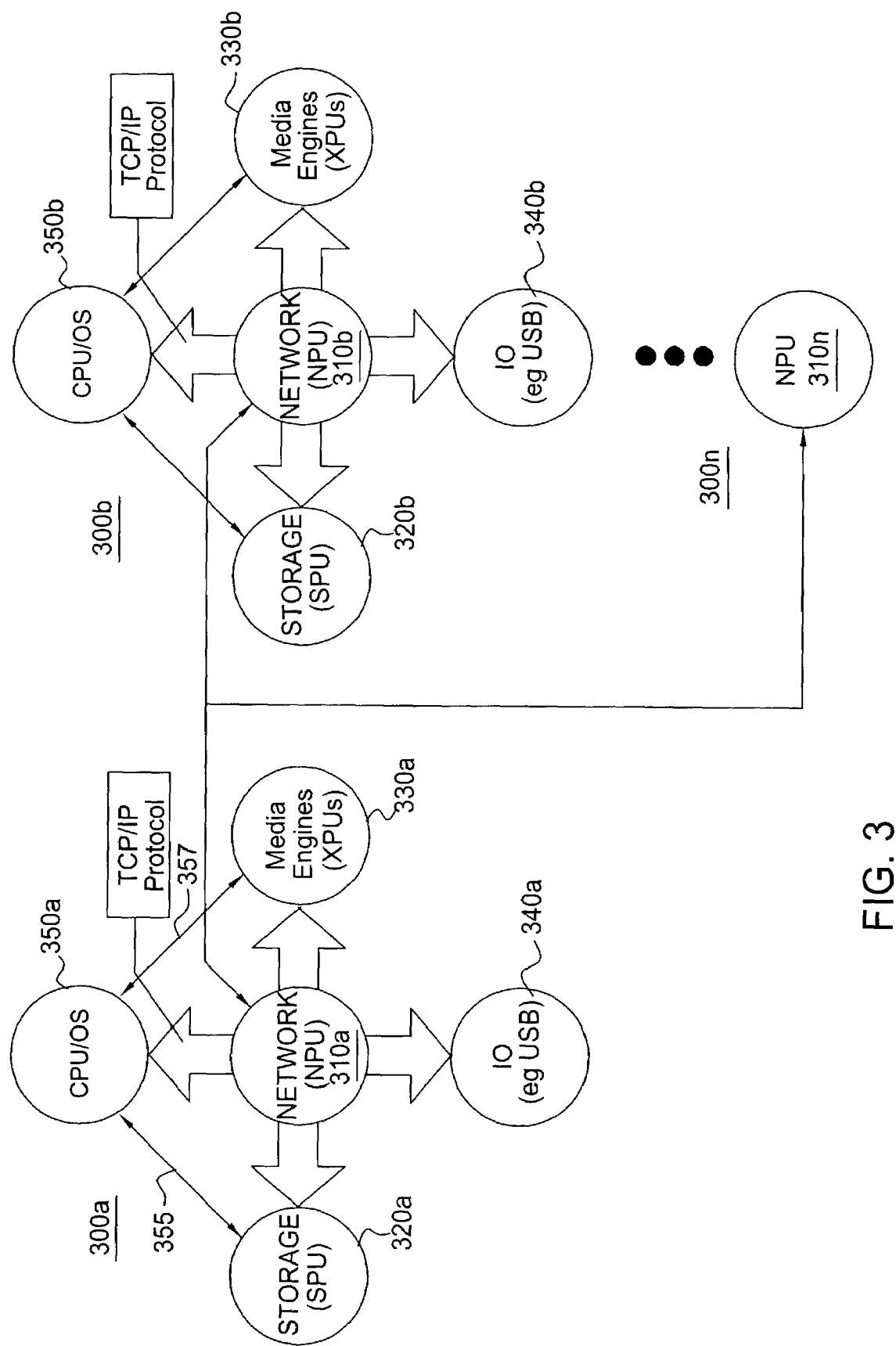
FIG. 3 illustrates a block diagram where a network of host computers are in communication with each other via a plurality of network processing units.

Second, an XPU can be placed on the network via the NPU and accessed remotely from other network nodes (as shown in FIG. 3 below). This indicates that an XPU is capable of processing information that is encapsulated in network packets.

Third, an XPU can be accessed as a "remote" node even from the local host. Communication is effected via the NPU by using network protocols.

Fourth, an XPU is always in an "on" state (like most appliances) even when the host (CPU+O/S) is in the "off" state. This unique feature allows the XPUs to operate without the involvement of the host CPU/OS, e.g., extracting data from a disk drive of the host without the involvement of the host. More importantly, the host's resources are still available even though the CPU/OS may be in a dormant state, e.g., in a sleep mode.

Fifth, an XPU has at least two sets of processing queues, one for non-real-time packets and at least one for real-time packets. This duality of queues combined with similar real-time queues in the NPU, allows the system of NPU and XPUs to guarantee latencies and bandwidth for real-time streams.

Sixth, an XPU has two software (SW) drivers, one that manages the host-side connection to the XPU, and one that manages the remotely-accessed component of the XPU. In operation, the SW drivers communicate with the XPU using abstract command queues, called push buffers (PBs). Each driver has at least one PB going from the driver to the XPU and at least one PB going from the XPU to the driver.

Seventh, an XPU can also be accessed on the host side directly by a user-level application. This involves lazy-pinning of user-space buffers by the O/S. Lazy-pinning means locking the virtual-to-physical address translations of memory pages on demand, i.e., when the translations are needed by the particular XPU. When the translations are no longer needed, they can be unlocked, allowing the operating system to swap out those pages. The virtual-to-physical mappings of these buffers are passed to the XPU. A separate pair of PBs are linked into the user's address space and the O/S driver coordinates context switches with the XPU.

Although the present invention discloses the use of a network processing unit 210 to perform routing functions without the involvement of the CPU/OS, the CPU/OS 250 nevertheless still has an alternate direct communication channel 255 with its resources, e.g., storage devices. This provides the host CPU/OS with the option of communicating with its resources or media engines via the NPU or directly via local access channels 255 or 257.

In fact, although the CPU/OS is not involved with the general routing function, in one embodiment of the present invention, exception routing issues are resolved by the host CPU/OS. For example, if the NPU receives a packet that it is unable to process, the NPU will forward the packet to the host CPU/OS for resolution. This limited use of the CPU/OS serves to accelerate host processing, while retaining the option to more judiciously use the processing power of the host CPU/OS to resolve difficult issues.

Additionally, the host resources may also be accessed via the NPU without the involvement of the host CPU/OS 250 via input/output communication channel 240, e.g., via an USB. For example, the present architecture can virtualize the remaining resources of the host computer 250, such as its physical memory, read only memory (ROM), real-time clocks, interrupts, and so on, thereby allowing a single chipset to provide multiple virtual hosts with each host being attached to the NPU 210.

One unique aspect of the present Invention is that the XPUs have logically direct attachments to the NPU that effectively serves as an integrated router, thereby allowing XPUs to be seen as separate network appliances. Since these auxiliary processing units have first-class status in this logical network architecture, they are allowed to communicate with each other or with any external computer (e.g., via another NPU) directly using standard internet protocols such as IP, TCP, UDP and the like without the involvement of the host CPU/OS. Using this novel architecture, the NPU provides both local (or host) access and remote access acceleration in a distributed computing environment.

FIG. 3 illustrates a block diagram where a network of host computers 300a-n are in communication with each other via a plurality of network processing units 310a-n. This unique configuration provides both host access and remote access acceleration.

Figure 4:
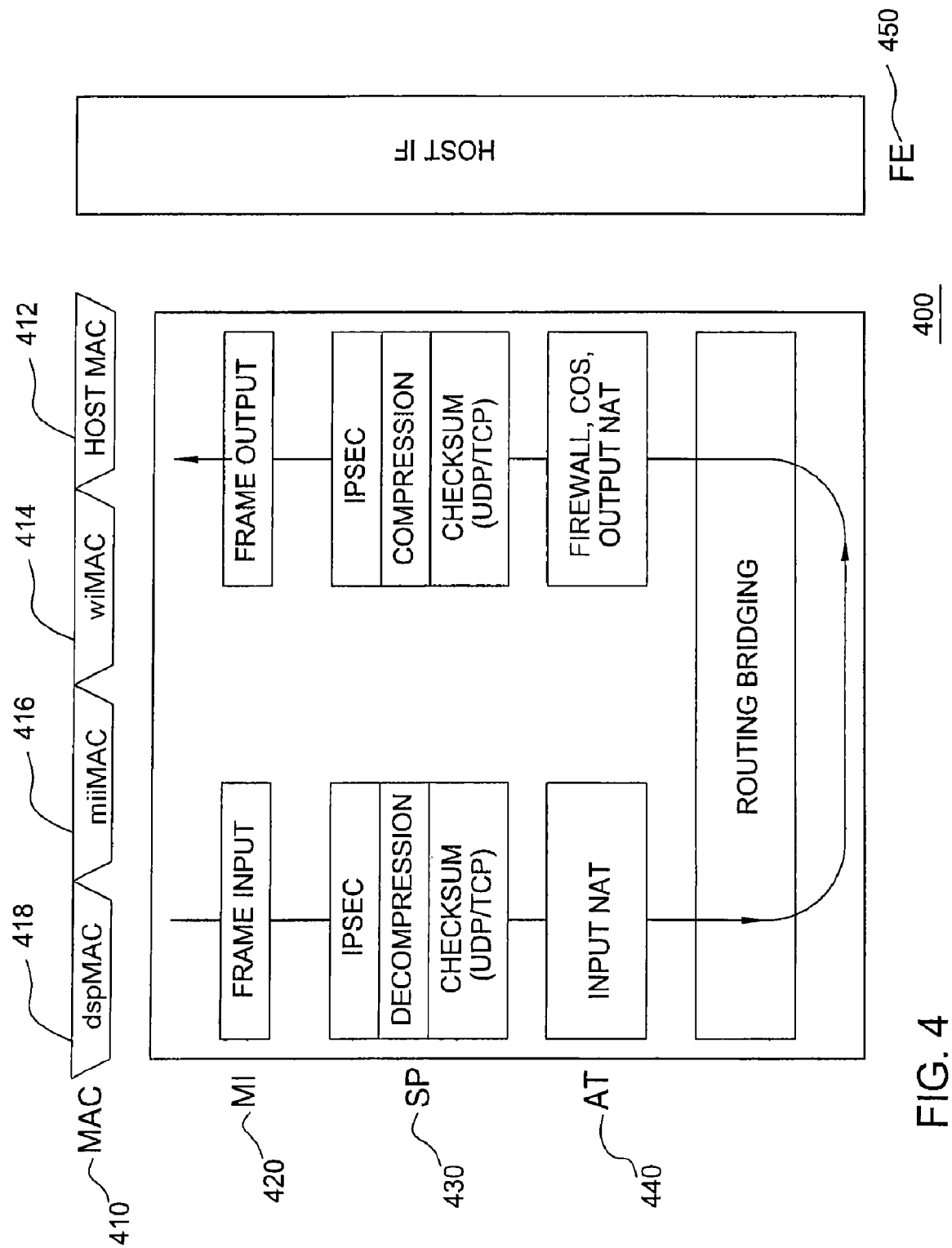
FIG. 4 illustrates a block diagram of a network processing unit of the present invention.

It is best to view this system of NPU and XPUs in the context of streams of packetized data that flow within this system. There are various types of streams that are allowed by the system. In this discussion, the term "host" means the combination of host CPU and memory in the context of the O/S kernel or a user-level process. The term "node" refers to a remote networked host or device that is attached to the NPU via a wired or wireless connection to a MAC that is directly connected to the NPU (e.g., as shown in FIG. 4 below).

A host-to-XPU stream is a stream that flows directly from the host 350a to the XPU 330a. This is a typical scenario for a dedicated XPU (e.g., a dedicated GPU via communication path 357). The stream does not traverse the NPU 310a.

An XPU-to-host stream is a stream that flows directly from the XPU to the host. One example is a local file being read from the SPU 320a via path 355. The stream does not traverse the NPU 310a.

A host-to-XPU-to-host stream is a stream that flows from host 350a to an XPU 330a for processing then back to the host 350a. One example is where the host forwards voice data directly to the APU for processing of voices into final mix buffers that are subsequently returned to the host via path 357. The stream does not traverse the NPU 310a.

A host-to-NPU-to-XPU stream is a networked stream that flows from the host 350a via NPU 310a to an XPU 330a or 320a. The three parties transfer packetized data using standard networking protocols, e.g., TCP/IP.

An XPU-to-NPU-to-Host stream is a networked stream that flows from an XPU 330a or 320a via the NPU 310a to the host 350a. The three parties transfer packetized data using standard networking protocols, e.g., TCP/IP.

A host-to-NPU-to-XPU-to-NPU-to-host stream is a networked stream that is the combination of the previous two streams. The three parties transfer packetized data using standard networking protocols, e.g., TCP/IP.

A host-to-NPU-to-Node stream is a networked stream that flows from the host 350a via the NPU 310a to a remote node (e.g., NPU 310b). This allows a local host 350a to communicate and access XPUs 330b of another host via a second NPU 310b.

A Node-to-NPU-to-Host stream is a reverse networked stream that flows from a remote node (e.g., NPU 310b) via the NPU 310a to the host 350a. This allows a remote NPU 350b to communicate with a local host 350a via a local NPU 310a.

A Node-to-NPU-to-XPU stream is a networked stream that flows from a remote node 350b via the NPU 310a to an XPU 330a where it terminates. This allows a remote NPU 310b to communicate with a local XPU 330a via a local NPU 310a.

An XPU-to-NPU-to-Node stream is a networked stream that flows from an XPU 330a where it originates to a remote node (e.g., NPU 310b) via local NPU 310a.

A Node0-to-NPU-to-XPU-to-NPU-to-Node1 stream is a combination of the previous two streams. It should be noted that Node0 and Node1 may be the same or different. For example, Node0 is 310a; NPU is 310b; XPU is 330b; NPU is 310b; and Node1 is 310n. Alternatively, Node0 is 310a; NPU is 310b; XPU is 330b; NPU is 310b; and Node1 is 310a.

A {Host,Node0,XPU0}-to-NPU-to-XPU1-to-NPU-to-XPU2-to-NPU-to-{Host,Node1,XPU3} stream is a stream that originates from the host, a remote node, or an XPU, passes through the NPU to another XPU for some processing, then passes through the NPU to another XPU for some additional processing, then terminates at the host, another remote node, or another XPU. It should be clear that the present architecture of a network of integrated processing units provides a powerful and flexible distributed processing environment, where both host access and remote access acceleration are greatly enhanced.

Under the present architecture, numerous advantages are achieved. First, it is beneficial to tightly integrate other computers and network appliances into the same chipset. Second, it is very advantageous to offload a host computer's I/O functions into a distributed network of intelligent processors, where traditional latencies associated with over-taxed CPU/OS are resolved. Third, it is advantageous to provide these auxiliary I/O processors with first-class network-appliance status within the chipset (optionally illustrated in FIG. 2 with dash lines) without changing the definition of the host computer. Fourth, it is advantageous to allow these auxiliary I/O processors to be shared among the host computer, external computers, and internal and external network appliances. Fifth, it is advantageous to allow the remaining resources of the host computer to be virtualized so that multiple virtual copies of the host computer may be embodied in the same chipset, while sharing the network of intelligent auxiliary I/O processors. Finally, it is advantageous to use a hardware-level operating system and graphical user interface (GUI) that allow the user to configure the network and seamlessly switch among virtual copies of the host computer or virtual host.

In one embodiment of the present invention, real-time media streaming is implemented using the above described network of integrated processing units. Specifically, media streaming typically involves multiple software layers. Thus, latencies can be unpredictable, particularly when the software runs on a general-purpose computer. More importantly, media streaming typically has a severe adverse impact on other applications running on the host computer.

However, by attaching media devices such as an APU or GPU to an NPU+SPU combination, it is now possible to minimize and guarantee latencies as well as offload the main host CPU. For example, referring to FIG. 3, control requests may arrive from a remote recipient 350b (typically attached wireless). These control requests may include play, stop, rewind, forward, pause, select title, and so on. Once the stream is set up, the raw data can be streamed directly from a disk managed by the SPU 320a through the NPU 310a to the destination client. Alternatively, the data may get pre-processed by the GPU 330a or APU 330a prior to being sent out via the NPU 310a. One important aspect again is that real-time media streaming can take place without host CPU 350a involvement. Dedicated queuing throughout the system will guarantee latencies and bandwidth.

This media streaming embodiment clearly demonstrates the power and flexibility of the present invention. One practical implementation of this real-time media streaming embodiment is within the home environment, where a centralized multimedia host server or computer has a large storage device that contains a library of stored media streams or it may simply be connected to a DVD player, a "PVR" (personal video recorder) or "DVR" (digital video recorder). If there are other client devices throughout the home, it is efficient to use the above network architecture to implement real-time media streaming, where a media stream from a storage device of the host computer can be transmitted to another host computer or a television set in a different part of the home. Thus, the real-time media streaming is implemented without the involvement of the host computer and with guaranteed latencies and bandwidth.

FIG. 4 illustrates a block diagram of a network processing unit of the present invention. Specifically, the present invention integrates the functions of an internet protocol (IP) router into the network processing unit (NPU) that resides in a host computer's chipset, where the NPU combines both host-side and general router/gateway accelerations. The NPU appears logically separate from the host computer even though, in one embodiment, it is sharing the same chip.

FIG. 4 illustrates a network processing unit (NPU) 400 having five modules or subunits: a media access controller (MAC) subunit 410, a MAC interface subunit 420, a sequence processor (SP) 430, an address translation subunit 440 and a front end subunit 450. It should be noted that the media access controller (MAC) subunit 410 may comprise one or more MACs, e.g., a host MAC 412, a wiMAC 414, a media independent interface MAC 416 (miiMAC) and a dspMAC 418. These various MACs implement the data-link layer and handle link-level control.

The NPU subunits communicate with one another using a common interface type called the NPU Interface, which is similar to a non-split-write interface with shared address and data wires. In one embodiment of the present invention, most NPU interfaces are 32-bits wide in both address and data, whereas low-bandwidth interfaces are 8-bits wide to save area and avoid routing congestion. The NPU Interface is comprised of two point-to-point buses, one for write requests/data and read requests, and another for read return data.

To illustrate, assuming subunit xx is communicating with subunit yy with a 32-bit NPU interface, the xx2yy request (req) bus looks like this:

| | |
|---|---|
| yy2xx_busy | 0 if yy can swallow req/data this cycle; |
| xx2yy_req | 1 if xx has valid req/data this cycle; |
| xx2yy_cmd | 1 == write, 0 == read; other bits may be added; |
| xx2yy_iso | optional bit indicating isochronous req; |
| xx2yy_subid[?:0] | optional read subid if xx has multiple read request streams; this subid is passed back as rid_next on yy2xx bus below |
| xx2yy_sz[?:0] | optional number of 32-bit dwords minus 1; not required if one dword always |
| xx2yy_ad[31:0] | address or write data; first cycle of write is address; subsequent cycles are write data; reads have address cycle only |
| xx2yy_be[3:0] | optional byte enables (BEs); reverse sensed (be=0 means write/read all) |

-continued

| | |
|---|---|
| xx2yy_data[31:0] | 32 bits of data (dword); |
| xx2yy_eof | end of frame bit, used to delimit one frame from another without having to count; |

The cycle transfers if req==1 and busy==0. There may be arbitrary idle cycles between data cycles.

The yy2xx read return (rdat) bus looks like this:

| | |
|---|---|
| yy2xx_rdat_vld | current cycle has valid read data |
| yy2xx_rdat_subid[?:0] | original subid of read request (optional) |
| yy2xx_rdat[31:0] | read data |

The lack of flow control on the yy2xx bus implies that the read requestor must be able to swallow any read data that it has requested. There may bean arbitrary number of idle cycles between valid cycles.

The sender (xx) and receiver (yy) may use a req_next/busy_next interface so that the req and busy signals can be cleanly registered prior to fanout. This is particularly useful if the receiver has an input fifo, where an overflow register in the sender can be shifted to the fifo.

In operation, once the header of a frame is processed, a subunit can process through data cycles quickly. Specifically, ethernet frames flow from one subunit to the next. There's no recirculation and there is no requirement to provide signals going in the reverse direction.

In one illustrative embodiment, the above NPU pipeline is implemented as 32 bits wide (double word or "dword") and operates at 300 MHz, which is 1.2 GB/s raw bandwidth. However, those skilled in the art will realize that the present NPU pipeline is not so limited and can be implemented in different configuration to meet different requirements.

In fact, although the present invention discloses a plurality of functions performed by the present NPU pipeline, those skilled in the art will realize that the present invention can be adapted to include additional functions and/or only a subset of the functions disclosed in the present disclosure. Furthermore, the present disclosure employs unique reference labels to identify numerous buffers, interfaces, commands, and the like. These reference labels are intended to allow the reader to follow the present disclosure and are not intended to limit the scope of the present invention in any way, i.e., the claims may refer to these elements in a "generic" manner instead of their unique reference labels.

The present NPU employs different types of buffers and look-up tables to implement its unique pipeline architecture. These buffers and look-up tables are now introduced, but the reader will gain additional insights when these buffers are further described in operation with various subunits of the NPU as disclosed below.

Generally, the subunits will access physically-contiguous memory buffers as much as possible. There is no hidden address translation performed by the memory arbiter 451 of FIG. 5. It should be noted that the NPU software (SW) resides in the kernel, so there is no need to prevent SW from passing physical addresses to/from the NPU. In fact, SW may get these physical addresses from higher-level protocols in the kernel, and they could point anywhere in system memory.

The NPU uses four types of physically-contiguous buffers in system memory:
1. Push Buffers (PB)—circular buffer of commands from SW-to-FE/HM or from FE/HM-to-SW.
2. Frame Buffer (FB)—holds part of a frame, a whole frame, or multiple whole frames.
3. Frame Buffer Pointer List (FBPL)—an array of pointers to FBs; typically FBPLs are written into PBs as part of commands, but they can also be used as a general map of some logical space, such as a spill buffer.
4. Lookup Table (LT)—a compressed lookup.

All push buffers between the SW and FE/HM are physically contiguous because they are relatively small. PBs generally contain commands and pointers to data and generally do not contain large pieces of data.

In one embodiment, PBs are arranged as a circular buffer of 32-bit dwords. Each PB has a PBBASE register that denotes the dword-aligned physical byte base address of the PB. Each PB has a PBMAX register that denotes the number of bytes in the PB minus 1. Each PB has a PBPUT register that denotes the next dword-aligned byte offset to be written by the producer (initial value: 0). Similarly, a PBGET register denotes the next dword-aligned byte offset to be read by the consumer (initial value: 0). The PB is empty if PBGET==PBPUT. The producer may place at most PBMAX-7 bytes into the PB to avoid wraparound. The dword at offset PBMAX-3 is reserved for a memory copy of the PBPUT or PBGET pointer depending on the direction of the PB. This in-memory copy allows the CPU to poll out of cache rather than polling on the actual register in the NPU. The PBBASE, PBMAX, PBPUT, PBGET registers reside in the subunit that owns the PB, which is typically the FE 450 or HM 412.

The FE/HM will also interrupt the CPU when the single-bit PBINT register is 1 and the PB goes from empty to non-empty. For the rest of this discussion, PBPUT and PBGET refer to the actual values, which may be in NPU registers or in system memory.

The producer writes a dword command and a command-specific number of data dwords into the PB. Bits 31:24 of the command dword denote the command index; bits 23:0 contain command-specific arguments. The data dwords are also command-specific. Then the producer increments the PBPUT by 4*dwords. The producer must write a full command before incrementing PBPUT. The producer knows PBPUT at all times, but it will poll PBGET whenever the fifo does not have room in the PB for the full command. FE/HM as producer can poll PBGET continuously.

The consumer knows PBGET at all times. It polls PBPUT until PBPUT !=PBGET, at which time, it knows that the PB has a full command to process. FE/HM as consumer will poll PBPUT continuously.

A single frame buffer (FB) is physically contiguous. It could be small (e.g., 128 Bytes), medium (e.g., 2048 KB), or large (e.g., 16 MB). FBs are used for two operations: (1) holding part or all of a frame being sent by the host or received to the host, and (2) spill buffers used by the MI subunit to store frames temporarily while the NPU pipeline is backed up.

It is common for FBs to be virtually concatenated to create a logically larger FB, e.g., by using a FB Pointer List (FBPL) to achieve this. There are a number of operations where FBPLs can be used:

1. SW Passes Gathered Frame to HM

SW writes the FBPL for the frame into a SW-to-HM PB. Because each FB may have an arbitrary number of bytes passed down the SW stack from higher-level protocols, each "pointer" in the PB is actually a 64-bit physical address and a 32-bit byte length.

2. SW Provides Receive Buffers

SW writes a FBPL into a SW-to-HM PB to give HM a list of free FBs of the same size. In this case, the size of the FBs is specified in the PB command along with the FBPL and all FBs have the same size, so each "pointer" is just the 64-bit physical address of the FB. In practice, the SW passes the HM FBPLs for small FBs in one PB and FBPLs for large FBs in another PB, then the HM consumes these FBPLs on demand. SW replenishes the PBs with new FBPLs as the PB gets close to empty. In practice, each FBPL could have one FB and the command can be implicit, i.e., the PB simply contains pointers to receive FBs.

3. HM Passes Scattered Frame to SW

HM writes the FBPL for the received frame into a HM-to-SW PB, along with the CFH. The HM may use FBs from any of the FBPLs that the SW gave it previously in #2 above.

4. Spill Buffer (SB) Mapping

Since SBs can be very large, it may not be practical to require the spill buffers to be physically contiguous. However, it will be quite desirable to do so because there could be numerous SBs (i.e., one per priority fifo per MAC) and it would be desirable to avoid an FBPL for each one. Otherwise, SW must pass a pointer to each SB's FBPL in a SW-to-FE PB config command or it can place the mapping in the global cache ssram. The MI subunit uses the FBPL to map the FBs in the logically contiguous SB, which is circular. Other MI registers maintain each SB's SBFBPL-BASE, SBFBPLLEN, SBPUT, SBGET pointers. SBFBPL-BASE is a physical address of the FBPL, SBPLLEN is the dword-aligned byte size of the FBPL, and SBPUT and SBGET are logical byte offsets into the logical SB. Given a logical byte offset, it is easy to find the FBPL entry by right shifting the offset by log2 (FB size).

FBPLs have good locality and allow the NPU to burst write/read the list (e.g., a cacheline at a time). Locality is even better when they are collected together into a push buffer (PB) along with other commands that are being burst-written/read. Global cache ssram is used to stage writes and reads between the NPU and PBs or FBs.

The two core routing subunits (SP, AT) make extensive use of lookup tables that are stored partially in the cache ssram and partially in physically-contiguous system memory.

In general, SW writes the tables and the NPU subunit only reads them, but the present invention is not limited to this approach. SW attempts to place the most common entries in the cache ssram and the less common cases in system memory. Further, SW attempts to compress the tables in order to pack as much information as possible into the cache ssram and into each system-memory burst read. The NPU subunit can decompress the information on the fly. The subunit caches its most recent table lookup locally in FFs or a latchram under the assumption that there is temporal locality in the routing stream.

Occasionally, SW will rewrite lookup tables in the cache ssram and system memory for a particular subunit or change other routing parameters in subunit priv registers. Depending on the sizes of the tables, SW may also decide to change the allocation of cache ssram to the various subunits by adjusting their CBASE, CMAX registers. Similarly, using a SW-to-FE PB command, SW may change the location and size of the system-memory part of the lookup table by adjusting a lookup table's MBASE, MMAX registers.

In one embodiment of the present invention, rewriting a lookup table in the cache ssram and system memory for a particular subunit can be implemented as follows:

1) SW formats a copy of the lookup table in system memory to reduce latency.

2) SW sends the table information in an UPDATE_TABLE command in the SW-to-FE PB.

3) FE receives and processes the command.

4) FE informs MI to pause routing. MI will not inject any more frames into the routing pipeline, and incoming frames are spilled to memory.

5) FE waits for the routing pipeline to become idle by polling all the subunit xx2fe_idle signals.

6) FE writes the new lookup table contents into the cache and into system memory, where writing the CBASE, and CMAX registers has the side effect of invalidating any internal copies of lookup table entries inside the subunit.

7) FE tells MI to resume injecting frames.

Figure 5:
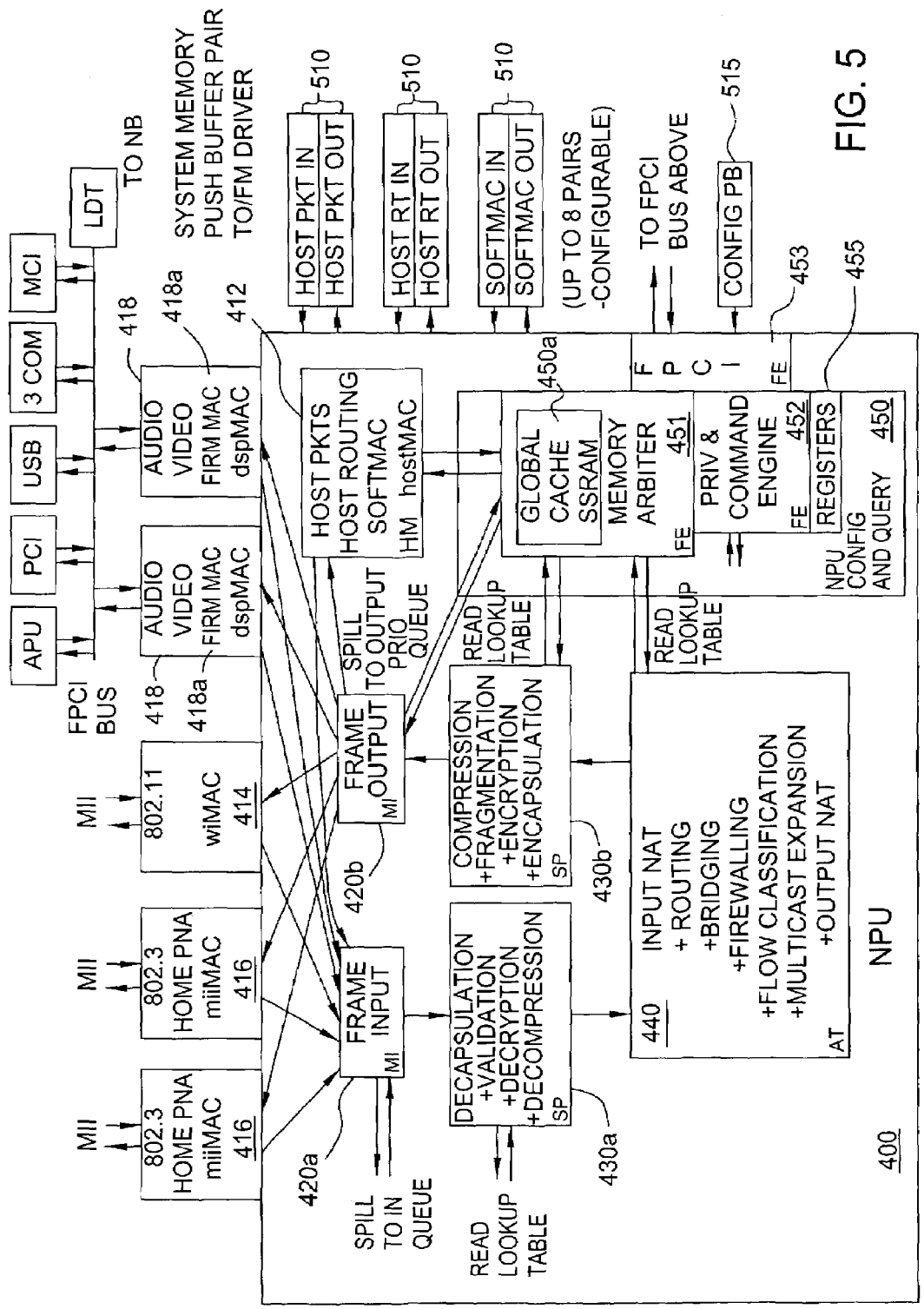
FIG. 5 illustrates a more detailed network processing unit (NPU) 400 of FIG. 4.

FIG. 5 illustrates a more detailed block diagram of the network processing unit 400 of FIG. 4. In brief, the host computer has a virtual port 412 (i.e., host MAC) that is in communication with the network processing unit 400 and communicates with the NPU as if it is an external network appliance using standard networking protocols. In one embodiment, abstract command queues called push buffers (PBs) 510 are provided for use with the host's "MAC" connection to the NPU. Push buffers 510 can be used to transmit and receive data frames and can also be configured to accept or produce abstract commands. In one embodiment, the push buffers are implemented in push buffer pair as shown in FIG. 5, e.g., ("host packet in" and "host packet out"; "host rt in" and "host rt out"; and "softmac in" and "softmac out"). Push buffers are further described below in greater detail.

Aside from the "host MAC", additional MACs can be implemented. For example, the miiMAC 416 implements 10/100/1000 802.3 and HomePNA and connects to external physical interface (e.g., analog part of a network interface) via standard MII/RGMII pins. The wiMAC 414 implements 802.11 MAC and connects to external baseband. The dspMAC 418 connects a general digital signal processor (DSP), e.g., any of the XPUs of the present invention, to the NPU. The DSP can run firmware 418a (e.g., called "firmMAC") to implement any arbitrary functions, such as voice over Internet Protocol (VoIP), bridging to some external NIC, future function offload, and so on. Thus, any frame that can be forwarded to the host can also be forwarded to an XPU, thereby providing the enormous flexibility that is a feature of the present invention.

Packets flow into the NPU from the MAC layer 410. The NPU 400 may store them in an on-chip cache or in system memory. Once a data frame has been received successfully from a MAC, the NPU may elect to forward the data frame through its acceleration pipeline.

The NPU pipeline is a novel symmetrical collection of modules, each implementing input and output side processing using shared module resources. The NPU pipeline broadly comprises a MAC Interface (MI) module 420, a Sequence Processor (SP) module 430 and an Address Translation (AT) module 440. The MI module in the pipeline serves as an asynchronous boundary between each MAC and the NPU. The Sequence Processor (SP) in the pipeline serves to provide automatic decapsulations, decryption, authentication, checksums, and decompression on the input side 430a and similar functions but in reverse order for its output side 430b. Although this is a default approach, an important aspect of the present invention is that all of these operations and their counterparts can be performed either "pre AT" or "post AT" by the SP. Finally, the Address Translation (AT) module implements routing and stateful firewall functions.

The present NPU pipeline provides numerous advantages. Some of these advantages are discussed briefly here, but will be further described below. First, multiple packets can be processed in parallel (even at each stage). Second, the architecture of the NPU pipeline allows new stages (and parallelism) to be added for new functions. Third, the NPU pipeline allows any packet to be forwarded to an on-chip DSP for unforeseen functions and interoperability workarounds, if necessary.

The front end (FE) module 450 serves as an interface module between software drivers and the NPU. Some of the functions performed by the front end module include, but are not limited to, interfacing with a PCI bus, configuring the NPU as to routing state, and performing memory access arbitration.

Specifically, the front end (FE) module comprises a memory arbiter 451, a privilege and command engine 452 and a FPCI (Fast PCI) interface 453 for communicating with the rest of the system. In one embodiment, the FPCI clock domain will operate at about 200 MHz in the NPU timeframe. It should be noted that "Async fifos" exist between the FPCI clock domain and the 300 MHz NPU clock domain.

The processes of the FE module will now be described in the context of "slave side" (e.g., including the privilege and command engine 452) and "master side" (e.g., including the memory arbiter 451). The slave and master sides operate independently.

The slave side processes FPCI configuration (config) accesses and NPU privilege (priv) accesses. It is generally preferred that the driver will only perform register accesses during initialization and interrupt handling, thereby avoiding register accesses during normal operation. NPU configuration during normal operation can be implemented via abstract push-buffer (PB) commands. This approach promotes driver forward and backward compatibility and avoids error-prone manipulations to the hardware.

FPCI config write and read operations are handled inside the FPCI block 453 in the FPCI clock domain. They manipulate the standard PCI config registers 515, plus other registers (not shown) that keep track of iso/niso subids, power management, etc.

All CPU register accesses pass through the FE 450. Specifically, NPU priv accesses generally refer to NPU memory-space accesses. These memory-space accesses from the CPU are "posted", i.e., meaning that they are fire-and-forget by the CPU.

In one embodiment, NPU priv accesses are 32-bits (FPCI sz=0). An NPU priv address has 16 relevant bits:

```
addr[31:16] == 0 (reserved)
addr[15:12] == subunit
              0 == Front End (FE)
              1 == HostMac (HM)
              2 == MAC interface (MI)
              3 == Sequence Processor (SP)
              5 == Address Translation (AT)
addr[11:0] == byte address within subunit
```

Each subunit also has an 8-bit NPU Interface with the FE priv block, so that each write takes six (6) cycles: two 8-bit addr cycles and four 8-bit data cycles. There are 4 byte-enable (BE) bits associated with each write or read. The 4-bit BEs occupy the upper 4 bits of the first addr cycle. Transfer order is big endian (i.e., read left to right). An 8-bit interface was chosen to reduce area and routing congestion in the partition. Assuming xx is the name of the subunit, the slave interface is named fe2xx_slv; the rdat interface is named xx2fe_slv_rdat. cmd[0] indicates read(0) vs. write(1). The address is dword-aligned.

Interface Instances are as follow:

fe2hm_slv—to HM subunit fe2mi_slv—to MI subunit fe2sp_slv—to SP subunit fe2at_slv—to AT subunit hm2fe_slv_rdat—read return data from HM mi2fe_slv_rdat—read return data from MI sp2fe_slv_rdat—read return data from SP at2fe_slv_rdat—read return data from AT Priv accesses go across an asynchronous fifo to the NPU clock domain where all the NPU registers reside. Read requests are immediately retried until the read data returns. This allows other transactions to make progress on the FPCI bus. If the async fifo is full, write requests will also be retried until the fifo drains one entry.

Once a priv access makes it into the NPU clock domain, the FE decodes its upper address bits [15:12] to determine the owning subunit and sends the access over the appropriate interface, e.g., fe2xx_slv. Read data is returned on another interface, e.g., xx2fe_slv_rdat, then passed back across a one-entry async fifo to the FPCI clock domain where it is returned at the next retry of the read by FPCI.

In one embodiment, the FE 450 has three sets of registers 455: 1) interrupt registers, 2) memory-arbiter performance registers, and 3) PB registers.

The PB registers are used to configure the NPU. The PB registers are identified as SW2FEPBBASE, SW2FEPBMAX, SW2FEPBPUT, and SW2FEPBGET. When the software adds a new command to the PB registers, it bumps the SW2FEPBPUT register, which triggers the engine 452 to begin processing commands in the PB registers.

Various SW-to-FE PB commands are now described, where "cmd" denotes the command dword, and "data0, data1 and so on" denote the data dwords. The priv and command engine 452 may need to perform internal priv writes/reads or memory arbiter transactions to accomplish these commands.

NOP (No-Operation)

cmd[31:24] == 0
cmd[23:0] == 0 (reserved)
    Does nothing.

SET ROUTING STATE cmd[31:24] == 3
cmd[23:22] == state == off(0), on(1), passthrough(2), or paused(3)
cmd[21:0] == 0 (reserved)
    If state is off, then any new or pending input frames are discarded, and this command will not retire from the PB until the NPU routing pipeline is idle. Any frame in the routing pipeline is routed normally.
    If state is on, then the NPU routing pipeline is enabled and all routing functions are enabled. Any pending frames are injected into the pipeline for routing. This command retires immediately.
    If state is passthrough, then all input frames are injected into the NPU pipeline in passthrough mode, implying that they simply flow untouched through the pipeline and get sent to the host for processing. This command retires immediately.
    If state is paused, then the NPU pipeline is marked as paused, but input frames are queued instead of discarded. This command will not retire until the NPU pipeline is idle.

| UPDATE TABLE |
|---|
| cmd[31:24] == 4 |
| cmd[23:22] == which == FC(0), SP(1), or AT(2) subunit lookup table |
| cmd[21:0] == 0 (reserved) |
| data0 == phys_addr |
| data1 == max |
| data2 == cbase |
| data3 == cmax |
|     This command traps if the current routing state is on. Typically, SW changes the routing state to "paused" prior to this command, then changes routing state back to on after this command. Each routing subunit (e.g., FE, SP, or AT) may have a single conglomerate lookup table, but this is not a limitation of the present invention. Thus, "which" indicates which lookup table is being rewritten. "Phys_addr" points to the starting physical byte address of the lookup table. The total length of the lookup table is "max"+1 bytes. The first "cmax"+1 (<= max+1) bytes of the lookup table are copied into the cache ssram starting at logical cache address cbase using memory arbiter DMA read commands. The subunit's mbase register is set to phys_addr+cmax+1. The subunit's mmax register is set to max-cmax-1. This command does not retire until all these updates are performed, where the FE waits for the appropriate number of mstr2pb_rdat dummy cycles to come back (one per pb2mstr DMA read command issued). |

The memory arbiter 451 performs the "master" side processes. Specifically, the FE Memory Arbiter performs three broad functions: (1) managing a shared cache ssram that software divides quasi-statically among the various subunits in the NPU, (2) handling system memory requests by subunits in the NPU (i.e., FE acting as an FPCI master), (3) performing direct memory accesses (DMAs) between cache ssram and system memory.

In one embodiment, the shared pool of cache ssram is logically contiguous and is 32-bit wide. It has legal byte addresses 0 . . . NPU_CMAX. NPU_CMAX_LG2 is the log2(NPU_CLEN_MAX+1) and can be used to construct address widths.

First, the memory arbiter 451 breaks cache ssram into multiple banks to achieve load-balancing and concurrency among different requestors (e.g., various subunits). The logical address space of the cache ssram is actually striped across multiple ssram banks. This improves ssram aspect ratios for placement/routing, provides load balancing, and allows the memory arbiter 451 to service multiple requests concurrently. In one instance, the memory arbiter 451 performs analysis determine optimal number of banks and aspect ratios of ssrams.

It should be noted that each subunit has a CBASE and CMAX register for each type of data that it may be caching in the cache ssram. Similarly, each subunit has an MBASE and MMAX register for each type of data that is accessing from system memory. Software will set up these registers and will ensure that different subunits do not collide.

Second, the memory arbiter 451 handles system memory requests by subunits in the NPU. In one embodiment, each subunit or module 420-440 has a 32-bit path to the memory arbiter. This approach simplifies the implementation of the subunit or modules 420-440 so that these modules are not required to perform complex buffer management.

To illustrate, assuming xx is the name of the requesting subunit, the request interface is named xx2fe_mstr; the rdat interface is named fe2xx_mstr_rdat. cmd[0] indicates read (0) vs. write(1). cmd[1] indicates cache ssram(1) vs. system memory(0) address. The address is dword-aligned. The "sz" may be 0-63 (1-64 dwords). In one embodiment, the FE will break up a request at 16DW cacheline boundaries. Thus, it is advantageous to have requests aligned on a 16DW boundary to avoid an extra break. A subunit may supply a different subid for each substream, if needed. The subid values are local to that subunit and are numbered starting at 0 per-subunit. There are no BEs on this interface.

Third, the memory arbiter 451 manages DMAs between cache ssram and system memory. Specifically, cmd[2] indicates whether a DMA between cache ssram and system memory (0=no DMA, 1=DMA) is performed. If a DMA is performed, then two address cycles are passed on "ad". The first address is a system memory address (cmd[1]==0) and the second address is a cache ssram address (cmd[1]==1). A write (cmd[0]==1) means that data is direct memory accessed from the cache ssram address to the system memory address. A read (cmd[0]==0) means that data is direct memory accessed from the system memory address to the cache ssram address. DMA reads can be pipelined like normal reads. When a DMA read finishes and all data is in the cache ssram, the memory arbiter 451 will assert a single fe2xx_mstr_rdat cycle with the original subid and dummy data. The requesting subunit can wait for these dummy rdat cycles to know when outstanding DMAs have finished.

Interface Instances:

| | |
|---|---|
| pb2mstr | from FE subunit (internal for push-buffer engine) |
| hm2fe_mstr | from HM subunit |
| mi2fe_mstr | from MI subunit |
| sp2fe_mstr | from SP subunit |
| at2fe_mstr | from AT subunit |
| mstr2pb_rdat | read return data to PB engine |
| fe2hm_mstr_rdat | read return data to HM |
| fe2mi_mstr_rdat | read return data to MI |
| fe2sp_mstr_rdat | read return data to SP |
| fe2at_mstr_rdat | read return data to AT |

The FE also exports an fe2xx_mstr_qempty signal on each interface to indicate that all previously injected commands have been accepted for arbitration. fe2xx_mstr_qempty can be used if the subunit needs to assert an interrupt to the FE that must be posted to the CPU after preceding writes to cache/memory.

Generally, there is no implied ordering of transactions among different requesters or between iso vs. non-iso transactions from the same requester. It should be noted that "iso" (isochronous) means "at the same rate", i.e., when the NPU makes isochronous reads of system memory via FPCI+LDT, the reads are guaranteed a certain precalculated latency and bandwidth. However, in one embodiment, for a particular requestor's iso or non-iso transactions, the following rules may apply to conflicting addresses:
    writes are ordered
    reads are ordered
    read response data comes back in order
    reads may not bypass writes
    writes may bypass reads In addition, non-iso read return data will not bypass CPU. The FE will post writes for MEM-space (priv) accesses. This implies that there are no interdependencies between the FE priv & command engine 452 and memory arbiter 451.

The memory arbiter 451 also controls writes to spill buffers. This function has a very high priority in order to avoid the dropping of frames.

As shown in FIG. 5, the memory arbiter 451 controls access to the global cache ssram 450a. In one embodiment, the arbitration strategy is "round-robin" except for spill buffer writes. Round-robin is a scheduling method in which processes are activated in a fixed cyclic order. Those which cannot proceed because they are waiting for some event (e.g. termination of a child process or an input/output operation) simply return control to the scheduler. The virtue of round-robin scheduling is its simplicity, where only the processes themselves need to know what they are waiting for or how to tell if it has happened.

Figure 6:
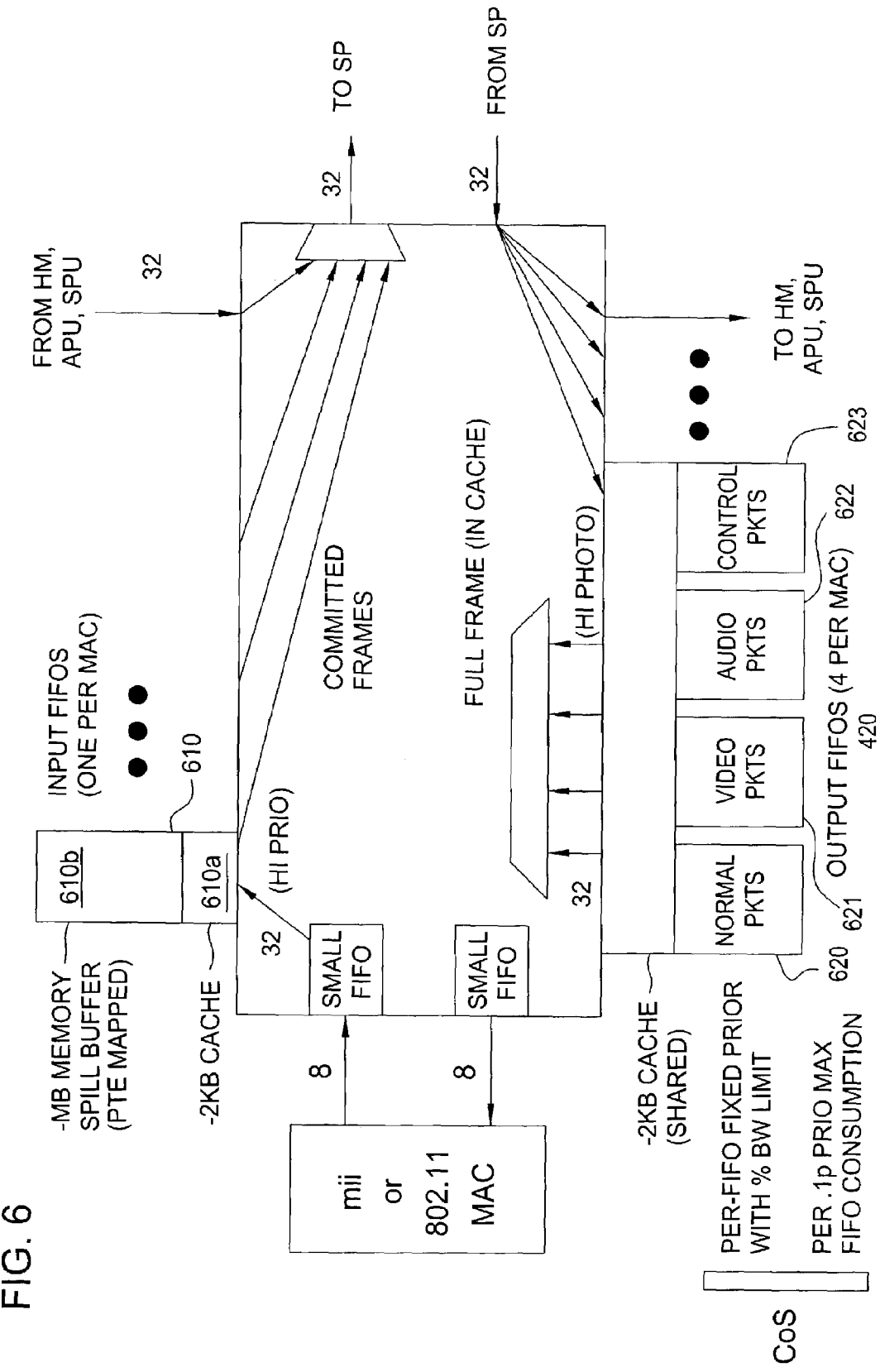
FIG. 6 illustrates a block diagram of the MAC Interface (MI) subunit of the present invention.

FIG. 6 illustrates a block diagram of the MAC Interface (MI) subunit or module 420 of the present invention. The MI module in the NPU pipeline serves as an asynchronous boundary between each MAC and the NPU.

The asynchronous boundary between each MAC in the MAC layer 410 and NPU resides within the MI. Each interface has an async fifo 610 that is deep enough to cover the latency across the boundary.

There are three clock domains: mclk (miiMAC), dclk (dspMAC), and nclk (NPU). Each side of the boundary obeys inter-partition timing rules.

From the MI's perspective, all miiMACs have the same interface. DspMAC and HostMAC (HM) have similar interfaces, with the exception of having 32-bit data paths and no sideband interfaces. The definitions of various MI interfaces are now provided and will be further discussed below.

MAC-to-NPU Input Frame Data Interface (mac2npu):

| | |
|---|---|
| npu2mac_busy | NPU is busy this cycle |
| mac2npu_req | mac2npu_data and eof are valid this cycle |
| mac2npu_data[7:0] | 8-bit data (note: 32-bit for dspMAC/hostMAC) |
| mac2npu_eof | end-of-frame marker |

NPU-to-MAC Output Frame Data Interface (npu2mac)

| | |
|---|---|
| mac2npu_busy | MAC is busy this cycle |
| npu2mac_req | npu2mac_data and eof are valid this cycle |
| npu2mac_data[7:0] | 8-bit data (note: 32-bit for dspMAC/hostMAC) |
| npu2mac_eof | end-of-frame marker |

NPU-to-MAC Sideband Interface (npu2mac_sb, Not Present for hostMAC):

| | |
|---|---|
| mac2npu_sb_busy | MAC is busy this cycle |
| npu2mac_sb_req | npu2mac_sb_data is valid this cycle |
| npu2mac_sb_data[7:0] | 8-bit sideband control information |
| sb[3:0] == 0 | priv write (1 byte of dword addr and 4 bytes of data follow this cycle) |
| sb[7:4] == be | (byte enables during command cycle) |
| sb[3:0] == 1 | priv read (1 byte of dword addr follows this cycle; read response comes back over mac2npu_sb) |
| sb[7:4] == be | (byte enables during command cycle) |
| sb[3:0] == 2 | pause MAC (sent when input fifo crosses highwater) |
| sb[3:0] == 3 | resume MAC (sent when input fifo crosses low-water) |

MAC-to-NPU Sideband Interface (mac2npu_sb, Not Present for hostMAC)

| | |
|---|---|
| npu2mac_sb_busy | NPU is busy this cycle |
| mac2npu_sb_req | mac2npu_sb_data is valid this cycle |
| mac2npu_sb_data[7:0] | 8-bit sideband control information |
| sb[3:0] == 0 | priv read response (4 bytes of data follow this cycle) |
| sb[3:0] == 1 | commit RX frame (0 bytes follow) |
| sb[3:0] == 2 | reject RX frame (0 bytes follow) |
| sb[7:4] == RX status: | 0 == early collision detected |
| | 1 == late collision detected |
| | 2 == runt frame (frame shorter than minimum for its medium) |
| | 3 == frame too long (larger than MTU size) |
| | 4 == mac2npu overflow (backed up too long) |
| | 5 == CRC mismatch |
| sb[3:0] == 3 | commit TX frame (0 bytes follow) |
| sb[3:0] == 4 | reject TX frame (0 bytes follow) |
| sb[7:4] == TX status: | 0 == early collision detected |
| | 1 == late collision detected |

Frames are received from the MACs via the MI subunit and are passed down the NPU pipeline for processing. Each MAC sends data to the MI over the "mac2npu interface", which is asynchronous as described above. The "mac2npu_sb" sideband interface is not used for frame receive. The npu2mac_sb sideband interface is used for sending pause/resume flow control messages to avoid input fifo overflows if the MAC can assert flow control back to its sender(s).

To illustrate, when a hard MAC wishes to send a frame, it first passes one byte of mac2npu_data indicating the type of frame being passed:

| | |
|---|---|
| data[7:4] == 0 | (reserved) |
| data[3:3] == has_802.1p | |
| data[2:0] == proto2 (level-2 protocol == Ethernet frame format) | |
| | 0 == 802.3/SNAP |
| | 1 == Ethernet II |
| | 2 == management frame (will be passed through) |

After this header byte, subsequent data bytes, which may have arbitrary bubbles, contain the frame itself in big-endian order. The last byte of the frame has mac2npu_eof==1.

MI stores away the header byte in a register, then gathers the frame one dword at a time and places these speculatively into the MAC's input fifo 610, which is further discussed below. To illustrate, after the eof byte, the MAC sends a status byte over "mac2npu" indicating the commit status of the frame, where "mac2npu" is synchronous with the frame:

| | |
|---|---|
| sb[3:0] == 0 == commit RX frame (0 bytes follow) | |
| sb[3:0] == 1 == reject RX frame (0 bytes follow) | |
| sb[7:4] == RX status: | 0 == early collision detected |
| | 1 == late collision detected |
| | 2 == runt frame (frame ended abruptly) |
| | 3 == frame too long (larger than MTU size) |
| | 4 == mac2npu overflow (backed up too long) |
| | 5 == CRC mismatch |

For hostMAC and dspMAC input frames, "mac2npu_data" is dword-wide. The MAC passes a Canonical Frame Header (CFH) instead of a header byte. After the eof dword, HM does not send a status dword. All HM frames are committed by HM implicitly and MI simply pretends that HM issued an explicit "commit frame".

More specifically, the present NPU supports the Ethernet frame formats. In operation, MI input processing strips off the Ethernet header for normal frames, but leaves it on for raw and management frames. In order to avoid reparsing the header information in each subunit, each frame is prefaced by four dwords (or two dwords as necessary) of Canonical Frame Header (CFH). The CFH together with the following frame make up the Canonical Frame (CF). The CFH layout is the following (best to read it LSB to MSB):

```
cfh0[31]     == has_cfh1: has CFH dword 1 (currently always 0)
cfh0[30:27]  == passthrough_after: passthrough after this function
                 0 == SP decapsulation
                 1 == SP decryption
                 2 == SP reassembly
                 3 == SP decompression
                 5 == AT input NAT
                 6 == AT routing
                 7 == AT output NAT
                 8 == SP compression
                 9 == SP fragmentation
                 a == SP encryption
                 b == SP encapsulation
                 f == MI output
cfh0[26:23]  == passthrough_before: passthrough before this function
                 0 == SP decapsulation
                 1 == SP decryption
                 2 == SP reassembly
                 3 == SP decompression
                 5 == AT input NAT
                 6 == AT routing
                 7 == AT output NAT
                 8 == SP compression
                 9 == SP fragmentation
                 a == SP encryption
                 b == SP encapsulation
                 f == MI output
cfh0[22]     == 0 (reserved)
cfh0[21:19]  == output_fifo_index (for output_mac)
cfh0[18:16]  == output_mac: output MAC index
cfh0[15:12]  == proto4 (higher-level protocol over IP; filled in by SP
                input and output)
                 0 == unknown
                 1 == ICMP
                 2 == TCP
                 3 == UDP
                 4 == ESP (encapsulating security payload)
                 5 == AH (authentication header)
cfh0[11:9]   == proto3 (level-3 protocol; filled in by MI input and
                SP output)
                 0 == unknown
                 1 == IPv4
                 2 == IPv6
                 3 == ARP
                 4 == PPP
                 5 == PPPoE
cfh0[8:6]    == prio: 802.1p priority bits (may not get used on output)
cfh0[5:3]    == proto2 (level-2 protocol == frame format)
                 0 == no frame header (stripped - normal for input)
                 1 == 802.3/SNAP
                 2 == 802.3/SNAP with 802.1p prio
                 3 == Ethernet II
                 4 == Ethernet II with 802.1p prio
                 7 == raw management (always passthrough)
cfh0[2:0]    == input_mac: input MAC index (needed by host/DSP for
                passthrough frames)
```

When MI output receives a CF with no frame header, it will add a frame type that is appropriate for the output_mac. MI input may mark a frame completely passthrough by setting passthrough_before=MI output. Once that's accomplished, passthrough_after is completely irrelevant because each subunit will not begin processing until passthrough_before is hit. MI input and output always execute, though they do nothing with passthrough frames. MI input may mark a frame as completely not passthrough by setting passthrough_before=0 and passthrough_after=0xf.

As disclosed above, each MAC has an input fifo 610. In one embodiment, part of the fifo space 610a resides in the global cache ssram, and the other part resides in system memory 610b. Each input fifo has the following attributes:

1) Cache SSRAM Base and Max (MIICBASE[0-7] and MIICMAX[0-7]).

The cache ssram base byte offset and max offset are occupied by each input fifo. These registers are kept in latchrams.

2) System Memory Base and Max (MIIMBASE[0-7] and MIIMMAX[0-7])

The system memory base byte offset and max offset are occupied by each input fifo. These registers are kept in latchrams.

3) Committed-Put Pointer

Committed-Put pointer is a pointer past last committed frame.

4) Speculative-Put Pointer

Speculative-Put pointer is a pointer to the next fifo location where a new dword will be written. Once the whole frame is written and committed by the MAC, the Committed-Put Pointer will get set to the Speculative-Put Pointer.

5) Get Pointer

The Get pointer is a pointer to the next fifo location to be read.

6) High and Low Water Marks (MIIHIWAT[0-7] and MIILOWAT[0-7])

When the fifo size crosses above the highwater mark, the MI will send a pause command over npu2mac_sb to tell the MAC to assert flow control back to its sender(s), if possible. When the fifo size crosses below the low-water mark, MI sends a resume command over npu2mac_sb to tell the MAC to allow the sender to resume sending. As a last resort, if the input fifo fills up, MI asserts flow control over mac2npu rather than discarding frame data. If the MAC loses a frame because mac2npu is backed up, then the MAC will reject the frame with mac2npu overflow. Some MACs, particularly pseudo MACs, may be able to deal with (or prefer) this kind of last-nanosecond flow control. Thus, the MI provides the MACs with the control in terms of rejecting frames.

Generally, the input fifo 610 will attempt to store the frames in cache ssram 610a to avoid going to system memory 610b. Thus, all input fifo writes are isochronous. They have top priority in the system to avoid dropping data.

Figure 7:
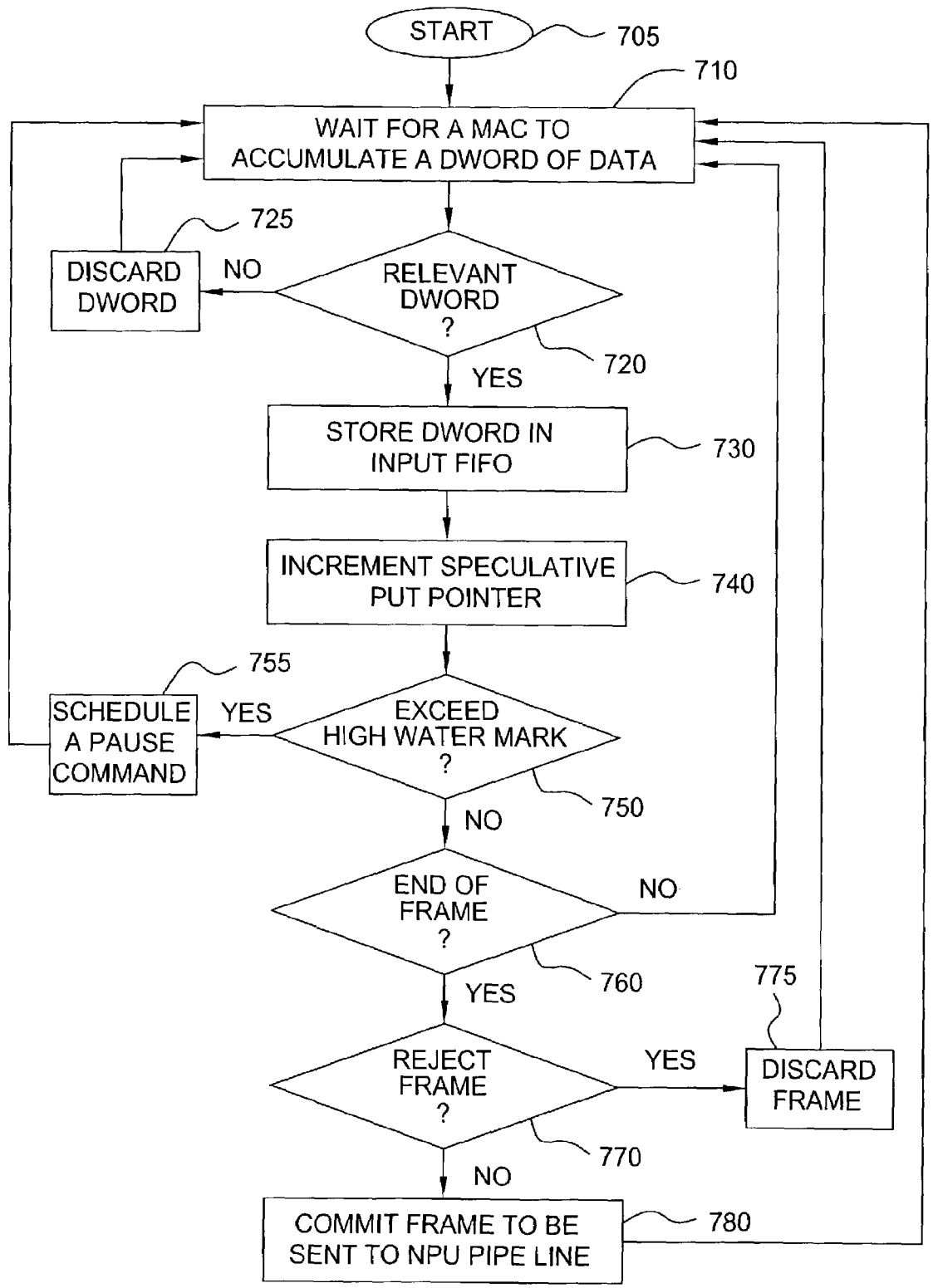
FIG. 7 illustrates a flowchart of a method for processing an input frame from a MAC by the MI.

FIG. 7 illustrates a flowchart of a method 700 for processing an input frame from a MAC by the MI. Method 700 starts in step 705 and proceeds to step 710.

In step 710, the MI waits for a MAC to accumulate a dword of data, e.g., over "mac2npu" or to commit/reject a frame via "mac2npu". If more than one MAC has either of these pending, then choose one MAC in accordance with the "round-robin" strategy. This implies that the MI operate on one MAC per cycle, so the method will store per-MAC info in latchrams to save area and read-out the info for the particular MAC that is being serviced on the current cycle.

It should be noted that method 700 will not consider a MAC if its input fifo is full (or full-1 if at the beginning of a frame). Instead, method 700 will assert flow control on "mac2npu" (i.e., set npu2mac_busy==1) until the input fifo goes non-full.

In step 720, method 700 queries whether the new data dword is a relevant data dword. For example, if this MAC is not in raw mode (MIMACCTL RAW_MODE bit is clear) and this is not a management frame and this dword is not in Ethernet header and this dword is not the HM CFH, then method 700 will discard this data dword in step 725 and returns to step 710.

Alternatively, if the query is positively answered, then method 700 proceeds to step 730, where the dword is stored in the input fifo 610. Additionally, if this is the first dword of the frame, then method 700 will reserve an extra dword to store the 802.1p priority bits and the frame dword count. This special dword will be written later when eof occurs. Method 700 keeps track of the fifo location of this special dword location in a temporary variable (one copy for each of 2 uncommitted frames). The dword is written into the input fifo 610 and method 700 will increment the speculative put pointer in step 740.

In step 750, method 700 queries whether the highwater mark, e.g., (MIIHIWAT[0-7]) is exceeded. If the query is positively answered, then method 700 proceeds to step 755 where it will schedule a pause command over npu2mac_sb. If the MAC is capable, it will assert flow control to its sender(s) to avoid frame loss. If the query is negatively answered, then method 700 proceeds to step 760.

In step 760, method 700 queries whether the end of frame has been reached, e.g., (mac2npu_eof==1). If the query is negatively answered, then method 700 returns to step 710.

If the query is positively answered, then method 700 will also write the saved 802.1p priority bits and the frame dword count in the pre-reserved input fifo location prior to the frame dwords. The dword count is just the current input fifo pointer minus the saved input fifo pointer. The 802.1p priority bits occupy [2:0] of the special dword. The dword count occupies [31:16] of the special dword and should not exceed the MTU for the MAC. Method 700 then proceeds to step 770.

In step 770, method 700 queries whether the frame is to be rejected. If the query is positively answered, then method 700 discards the frame in step 775 and returns to step 710. Namely, the frame just entered into the input fifo is discarded by resetting the speculative put pointer to the committed put pointer. If the query is negatively answered, then method 700 proceeds to step 780.

In step 780, method 700 set the input fifo committed-put pointer to the speculative put pointer, thereby committing the entire frame to be sent to the NPU pipeline for processing. Method 700 then returns to step 710.

Once a frame is committed in an input fifo for a MAC, the MI, in parallel, must now select a committed frame from one of the many input fifos to send down the NPU pipeline, i.e., to the Sequence Processor.

In operation, the MI looks at the get and committed-put pointers of the input fifos to see which input fifos have committed frames. Using round-robin scheduling, the MI will choose the next input fifo to service, regardless of whether the input fifo data is in cache ssram or system memory. Alternatively, the MI may optionally consider a MAC only if it has an entire frame already in ssram.

Returning to FIG. 6, there are four output fifos 620-623 for each output MAC. The CFH of an incoming frame contains the output MAC index and output fifo index. Output FIFOs are basically implemented the same as input fifos, but they have several additional properties. Each output FIFO has the following attributes:

1) Cache SSRAM Base and Max (MIOCBASE[0-7] and MIOCMAX[0-7])

The cache ssram base byte offset and max offset are occupied by each set of output fifos. These registers are kept in latchrams. A given MAC's output fifos share the same cache ssram.

2) System Memory Base and Max (MIOMBASE[0-7] [0-3] and MIOMMAX[0-7] [0-3])

The system memory base byte offset and max offset are occupied by each output fifo (8 MACs×4 output fifos). These registers are kept in latchrams.

3) Committed-Put Pointer

The Committed-Put Pointer is a pointer past last committed frame from SP.

4) Speculative-Put Pointer

The Speculative-Put Pointer is a pointer to the next fifo location where a new dword will be written from SP. Once the whole frame is written and committed by the MI input from SP, the Committed-Put Pointer will get set to the Speculative-Put Pointer. This speculative pointer is needed to address a possible fifo overflow condition.

5) Speculative-Get Pointer

The Speculative-Get Pointer is a pointer to the next fifo location to be read for attempted transmission to a MAC. If a frame is rejected by a MAC, then the Speculative-Get Pointer is reset to the Committed-Get Pointer for a possible retry. Otherwise, the Committed-Get Pointer will be set to the speculative-get pointer (past the frame) if the frame is being discarded.

6) Committed-Get Pointer

The Committed-Get Pointer is a pointer to the next fifo location after last frame that was committed by a MAC via mac2npu_sb commands.

7) Cutoff Fraction (per Priority)

For each frame priority (0-7), there is a number, expressed as an N/128 fraction (127/128==1) that is multiplied by the total size of the fifo to determine the cutoff point for deciding whether to write the frame into the fifo. If the total number of bytes in the fifo is less than the cutoff, then the frame is written, otherwise the frame is discarded. The MIOCUTOFF [0-7] registers (implemented in latchrams) contain the cutoff values, one per priority.

8) BW Fraction (per MAC, per fifo)

For each output MAC fifo, there is a number, expressed as an N/1024 fraction (1023/1024==1), that is multiplied by the BW Window (MIBWWIN) register (contains number of NPU clock cycles in the BW window), to determine the number of bytes that may be sent in the current BW window from this output fifo. The MIOBW[0-7]_[0-3] registers keep track of the number of bytes sent during the current window from each MAC's output fifo. These registers reside in latchrams.

9) Scheduling Priority (pre MAC, per fifo)

For each output MAC fifo, there is a 3-bit number denoting the fixed priority of the output fifo. The MIOPRIO [0-7]_[0-3] registers hold these values in latchrams (4 separate latchrams so all priorities can be compared at once). Assuming a fifo has not exceeded its BW Fraction for the current BW Window, the highest priority output fifo will be chosen next for a given MAC, with round-robin scheduling among those of equal priority.

Again each output fifo will attempt to keep everything in cache ssram to avoid going to system memory.

In operation, the MI will send frames to a MAC over the "npu2mac" interface, which is asynchronous as described above. The "mac2npu_sb" sideband interface is used by the MAC for committing or rejecting send frames. However, the npu2mac_sb interface is not used by the output side.

The MI will process one dword per cycle by executing the method of FIG. 8 below. The MI will keep state for each output MAC, so it can resume execution for any MAC during any given cycle. If the MI is trying to write to a given npu2mac interface and mac2npu_busy is set, then the MI will switch to processing a different output MAC until the interface is relieved. Similarly, the MI will read a dword out of the output fifo, but the miiMACs's npu2mac interfaces can only handle 1 byte at a time. Thus, the MI will switch to a different output MAC while the 4 bytes are being sequenced.

Additionally, the MI can send two uncommitted frames to a MAC before having to wait for a commit or reject status. This is important in order to hide the commit/reject latency across the asynchronous boundary and back.

Figure 8:
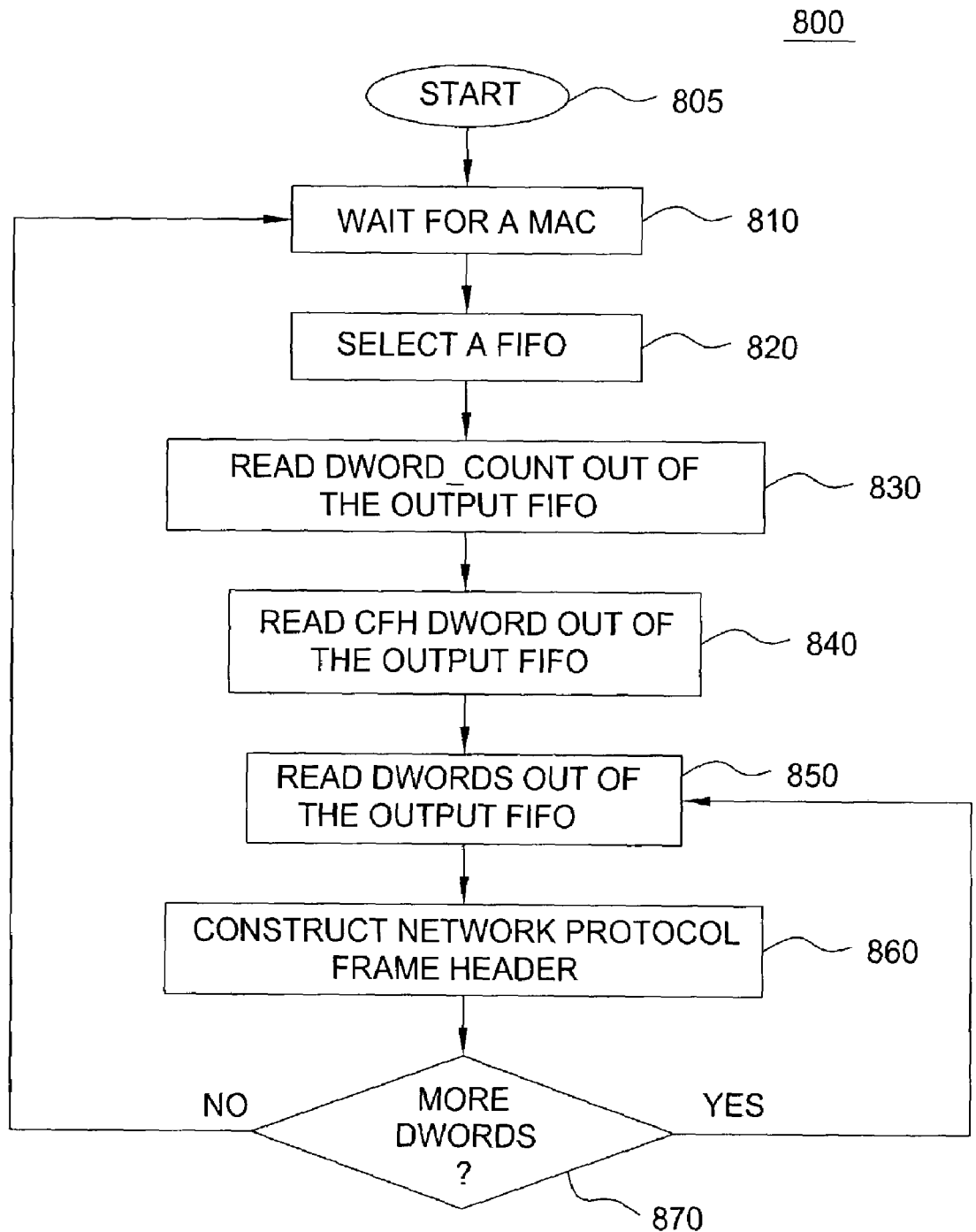
FIG. 8 illustrates a flowchart of a method for processing an output frame from an output fifo to a MAC by the MI.

FIG. 8 illustrates a flowchart of a method 800 for processing an output frame from an output fifo to a MAC by the MI. Method 800 starts in step 805 and proceeds to step 810.

In step 810, method 800 waits for a MAC to have a change in one of its output fifos. If more than one MAC has a change pending, then method 800 selects one in accordance with the round-robin strategy. The MI processes one MAC dword per cycle. One advantage to this approach is that MAC registers can be kept in latchrams because only one MAC will be processed at a time.

In one embodiment, method 800 will not choose a MAC if it already has two uncommitted frames outstanding or if it is retrying a send and it has one uncommitted frame outstanding. If the MI is retrying a send for the chosen MAC, then it is forced to choose the output fifo that has the retry.

Once a MAC is selected, method 800 selects one of output fifos for the MAC in step 820. Namely, method 800 selects the non-empty output fifo with the highest Scheduling Priority. Method 800 will use round-robin strategy if multiple output fifos for the MAC are non-empty. If the output fifo has exceeded its maximum BW Fraction during the current BW Window (described earlier), then method 800 will mark this fifo as not schedulable until the next BW Window.

In step 830, method 800 reads the dword_count out of the output fifo. If the ignore flag in the MSB of the dword_count is set, then method 800 will increment the speculative-get pointer by dword_count. Otherwise, method 800 will increment the speculative-get pointer by 1 dword.

In step 840, method 800 reads the CFH dword out of the output fifo, and increments the speculative-get pointer. It should be noted that for dspMACs and hostMAC, method 800 will skip step 840 and proceeds directly to step 850, where dwords are passed blindly over to "npu2mac", including the CFH. If the CFH's proto2 field is raw, then method 800 will also proceed directly to step 850.

Otherwise, the CFH's proto2 field must be no frame header. The method 800 will save the prio bits and read the appropriate MIMACCTL[0-7] MIOFMT field to determine the type of Ethernet frame to send to the MAC (802.3/SNAP or Ethernet II, 802.11 or not).

In step 850, method 800 reads the next dwords, e.g., 2 dwords, from the output fifo. These dwords contain the 48-bit Ethernet destination address. For an 802.11 output MAC, the next three dwords are actually read to get the 48-bit destination address and the 48-bit one-hop address, both of which are required.

In step 860, method 800 constructs the proper network protocol, e.g., Ethernet, frame header using the previously gathered fields.

In step 870, method 800 queries whether there are additional dwords. If the query is positively answered, then method 800 continues reading dwords from the output fifo in step 850 and writing them to npu2mac until all dword_count dwords are exhausted out of this frame. Again, the speculative-get pointer is incremented at this point because the MAC has not yet committed the frame. For the last byte/dword, set npu2mac_sb==1. If the query is negatively answered, then method 800 returns to step 810.

It should be noted that method 800 previously stored the output fifo for the first uncommitted frame and second (if any). If there is a second uncommitted frame, then method 800 waits for the status of this second frame over mac2npu_sb before doing anything else. If the status of the second frame is "reject", then method 800 ignores the fact that there is a second frame, including resetting the second frame's output fifo speculative-get pointer to before the second frame. If the status of the second frame is "reject", then method 800 writes to the ignore flag in MSB of the dword_count indicating that this second frame is being ignored. At this point, there is no need to worry about the second frame any longer.

However, if the per-MAC retry count is equal to the MIOMAXRTRY[0-7] register, then method 800 will discard the first frame. Method 800 will clear the retry count and set the committed-get pointer to the speculative-get pointer.

Otherwise, method 800 will increment the per-MAC retry count and reset the speculative-get pointer to the committed-get pointer. Method 800 will mark the output fifo in question as being chosen next due to retrying. This will ensure the resending of the frame.

The "npu2mac_sb" interface is used for issuing priv writes and reads to the MAC. Specifically, the MI receives 4-bit BEs and a 12-bit address over fe2mi_slv (2 cycles with bits in big-endian order). The upper 4 bits of the 12-bit address inform the MI where the priv access is destined. If addr[11] is 1, then the priv access is destined for the MAC denoted by addr[10:8] and addr[7:0] is the internal MAC dword address (i.e., up to 1024 bytes of MAC address space). If addr[11] is 0, then addr[10:0] denote the MI priv byte address. The "npu2mac_sb" and "mac2npu_sb" interfaces multiplex priv accesses with other commands from MI or MAC. Priv accesses have top priority and will stall other commands.

Figure 9:
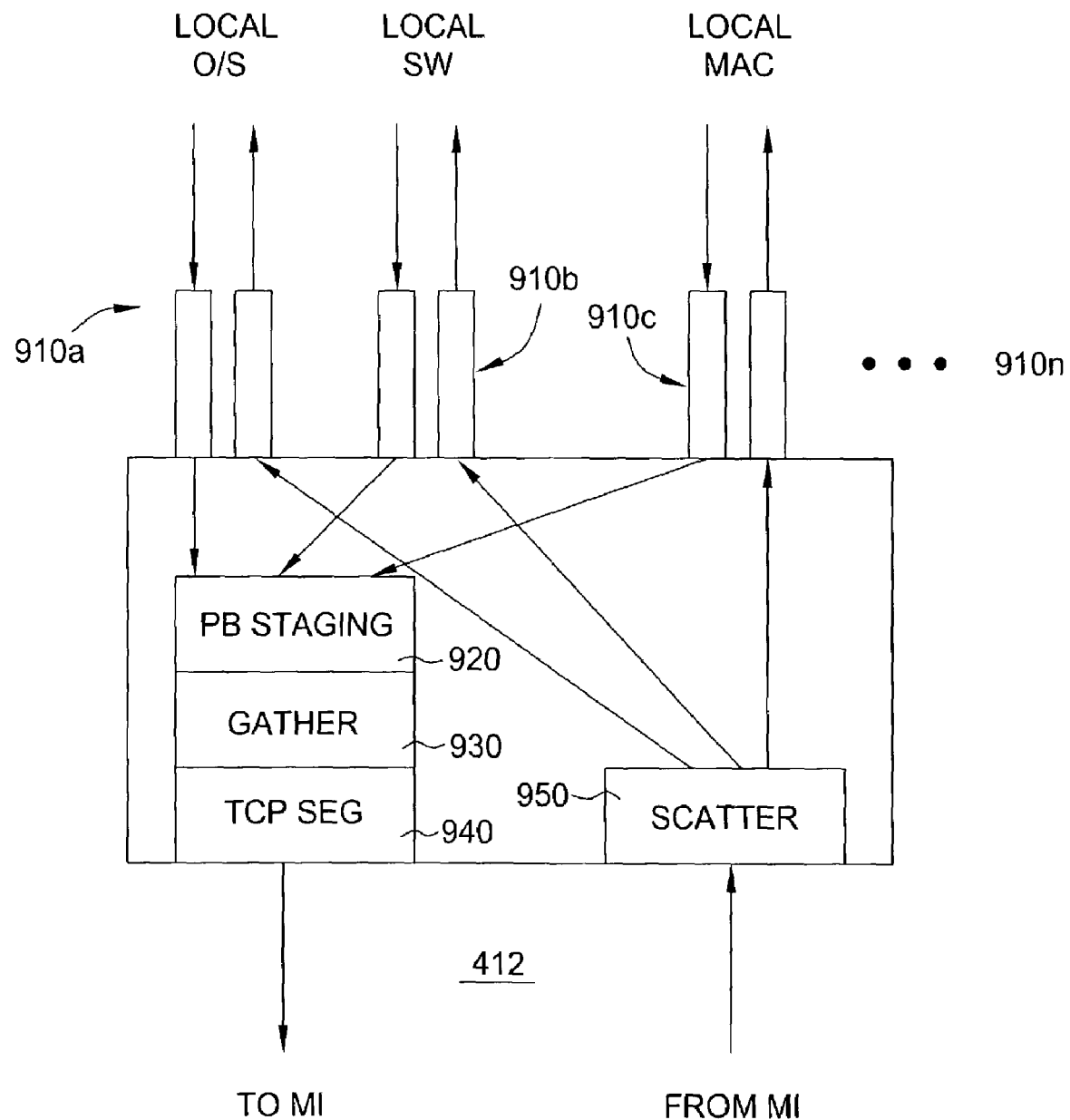
FIG. 9 illustrates a block diagram of the HostMAC (HM) subunit of the present invention.

FIG. 9 illustrates a block diagram of the HostMAC (HM) subunit 412 of the present invention. As discussed above, the interfaces between the MI and the HM differ from the typical miiMAC interfaces in several areas. First, the interfaces are synchronous raw interfaces without any fifos. Second, the mac2npu and npu2mac interfaces are 33-bit-wide synchronous data paths (instead of 9-bit asynchronous) to match the NPU bandwidth: 32 bits data, and 1 bit end-of-frame (eof). Third, there are no mac2npu_sb and npu2mac_sb sideband interfaces. Frames are always committed by the HM and pause/resume commands are disabled for the HM. Finally, priv accesses go through the fe2hm_slv interface.

The HM is deployed with a set of PBs 910a-n, e.g., 16 push buffers that are configurable. These push buffers reside in the system memory. For example, the HM PBs can be used for host destined and originated frames 910a, free receive buffers provided by SW, frames routed by SW 910b, or frames going to or from a softMAC 910c (which is then bridged to some external network adaptor).

The configuration of these push buffers is controlled using the following priv registers, most of which can reside in the latchram.

1) PB Control (HMPBCTL[0-15])

This priv register defines the type of PB where (0==SW-to-HM free receive buffers, 1==HM-to-SW receive frames, or 2==SW-to-HM send frames).

2) PB System Memory Regs (HMPBBASE[0-15], HMPBMAX[0-15], HMPBPUT[0-15], HMPBGET[0-15])

The HMPBBASE register denotes the dword-aligned physical byte base address of the PB. The HMPBmax register denotes the number of bytes in the PB minus 1. The HMPBPUT register denotes the next dword-aligned byte offset to be written by the producer. Similarly, the HMPBGET register denotes the next dword-aligned byte offset to be read by the consumer. The operation of these priv registers is disclosed above.

3) PB Cache SSRAM Staging Buffer (HMPBCBASE[0-15] and HMPBCMAX[0-15])

Every PB has a small staging area 920 in the global cache ssram. The HM performs burst DMAs between the ssram staging area and the system memory. HM-to-SW PBs need small staging buffers, e.g., enough for a 16-dword burst. SW-to-HM PBs have enough staging area to hide memory latency (100+NPU clocks) and allow for double-buffering so that the next block of data can be read while the current is being processed. Keeping these staging areas in the cache ram avoids using expensive rams in the HM and all the logic necessary to manage them.

4) SW-to-HM PB Control (HMIPBCTL[0-7])

This register manages the indexes for up to 8 SW-to-HM PBs for host send frames. A valid bit indicates whether this SW-to-HM PB slot is active. A 4-bit pb_index indicates which of the 16 general PBs is being used to implement this SW-to-HM PB. A 3-bit priority field indicates the scheduling priority of this SW-to-HM PB.

5) HM-to-SW PB Control (HMOPBCTL[0-7])

This register manages the indexes for up to 8 HM-to-SW PBs for host receive frames. A valid bit indicates whether this HM-to-SW PB slot is active. A 4-bit pb_index indicates which of the 16 general PBs is being used to implement this HM-to-SW PB. A 4-bit free0_pbindex and a free1_pb_index indicate which of the general PBs are used by the host to supply free buffers. Typically, one index will supply small buffers and the other index will supply a large buffer, but if both indexes point to the same PB, then only one buffer size is configured. A 16-bit inline_cutoff value indicates how small a frame needs to be before it will be embedded in an HM-to-SW PB rather than being scattered 950 to free buffers. A value of 0 disables inlining.

SW-to-HM PBs exist for frames that the host sends as an endpoint on the network or that it is rerouting to the NPU. The following commands are defined in this PB:

```
NOP
cmd[31:24]      == 0
cmd[23:0]       == 0 (reserved)
                   Does nothing.
FRAME
cmd[31:24]      == 1
cmd[23]         == inline (0 gather, 1 == data embedded in this command)
cmd[22:20]      == 0 (reserved)
cmd[19:12]      == n (if inline==0, number of <phys_addr, len> pairs;
                   if inline==1, number of data dwords after CFH)
cmd[11:0]       == 0 (reserved)
data0           == CFH (same format as defined in general discussion)
```

-continued

```
data1           == FB0 physical address (if inline==0)
data2           == FB0 byte length (if inline==0)
...
data2n-1        == FBn-1 physical address (if inline==0)
data2n          == FBn-1 byte length (if inline==0)
```

The host has constructed a frame with canonical frame header CFH. If inline==0, then the frame contents are gathered 930 from the list of n frame buffer (FB) pointers given in the variable-length command. The HM concatenates all the FBs (big-endian byte order) and sends them to the MI. The SW is free to reuse these FBs once the HM advances the PBGET pointer past this command. If inline==1, then the frame contents and the n dwords are embedded in this command after the CFH. HM then sends them to the MI.

SW-to-HM PBs that supply free receive buffers to HM have the following commands defined:

```
NOP
cmd[31:24]      == 0
cmd[23:0]       == 0 (reserved)
                   Does nothing.
FBPL (frame buffer pointer list)
cmd[31:24]      == 2
cmd[23:16]      == n (number of free buffer pointers in this command)
cmd[15:0]       == buff_len (bytes in each free buffer in this command)
data0           == FB0 physical address
data1           == FB1 physical address
...
datan-1         == FBn-1 physical address
```

The host has passed down a list of pointers to the n free frame buffers, each of buff_len bytes. The HM uses these buffers for scattering HM-to-SW PB frames.

Specifically, it should be noted that the push buffers could be deployed in pairs or in triplets (two input and one output buffers). For example, in the triplet instance, a Host may provide one input buffer to hold the actual frame commands and another input buffer to supply free buffers for the output. Namely, a third "freelist" buffer can be added to each pair of push buffers that contains commands for free buffers for scatter operation. In operation, the free buffers will have pointers such that it is not necessary to consult a link list.

Figure 10:
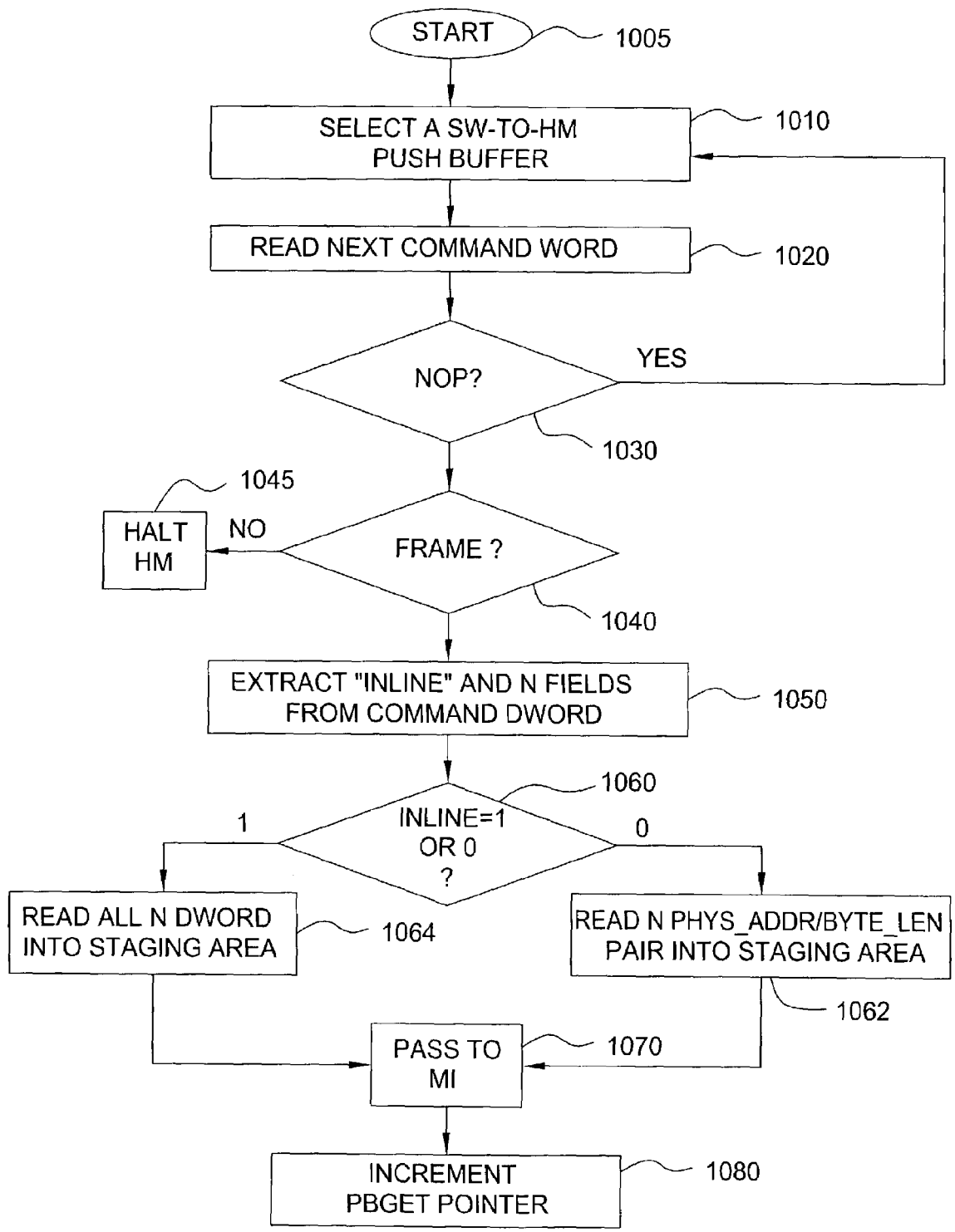
FIG. 10 illustrates a flowchart of a method for transferring frames from SW-to-HM push buffers to the MI.

FIG. 10 illustrates a flowchart of a method 1000 for transferring frames from SW-to-HM push buffers to the MI. Namely, the HM performs burst reads of commands and keeps them moving along to avoid latency in processing the commands.

Method 1000 starts in step 1005 and proceeds to step 1010. In step 1010, method 1000 selects a SW-to-HM push buffer by detecting how many SW-to-HM push buffers are not empty. In one embodiment, method 1000 selects the one with the highest "sched_prio", with round-robin strategy for breaking ties. The HMIPBCTL registers indicate which PBs are configured as SW-to-HM PBs and their sched_prio.

In step 1020, method 1000 reads the next command dword out of the PB and determines whether the command is a NOP (No-Operation) command in step 1030. If the query is positively answered, then method 1000 returns to step 1010 and the NOP is discarded. If the query is negatively answered, then method 1000 proceeds to step 1040.

In step 1040, method 1000 queries whether the command is a frame command. If the query is negatively answered, then method 1000 proceeds to step 1045 and the HM is halted. Namely, if the command is not a Frame command, then something is very wrong. Method 1000 will set HMT-STATUS to BAD_PB_CMD, and will pulse the hm2fe_tint (trap interrupt) signal to the FE. If the query is positively answered, then method 1000 proceeds to step 1050 where the "inline" and "n" fields are extracted from the command dword.

In step 1060, method 1000 queries whether the "inline" is equal to a 0 or a 1. If the inline is equal to 1, then "n" denotes the number of dwords. Method 1000 then proceeds to step 1064 and reads all "n" dwords from the PB into the input data staging area (HMICBASE/HMICMAX priv regs denote range in cache ssram).

If the inline is equal to 0, then "n" denotes the number phys_addr/byte_len pairs. Method 1000 then proceeds to step 1062 and reads each pair out of the PB. Method 1000 will burst read the byte_len buffer into the input data staging area in global cache ssram. The HM should process more than one pair at once, thereby keeping the input staging area full at all times.

In step 1070, as dwords show up in the input staging area, the HM passes them to the MI as fast as possible, while respecting the busy signal from MI. It should be noted that this step occurs in parallel with this entire method 1000, thereby allowing another Frame command to start before the input data staging area has been emptied to the MI. HM does not need to commit the frame to the MI. Namely, the HM trusts the kernel and the MI assumes that the frame is always committed.

In step 1080, after all n elements of the Frame command have been consumed, method 1000 will increment the PBGET pointer past the Frame command. This informs the SW that it may reuse its send buffers.

Figure 11A:
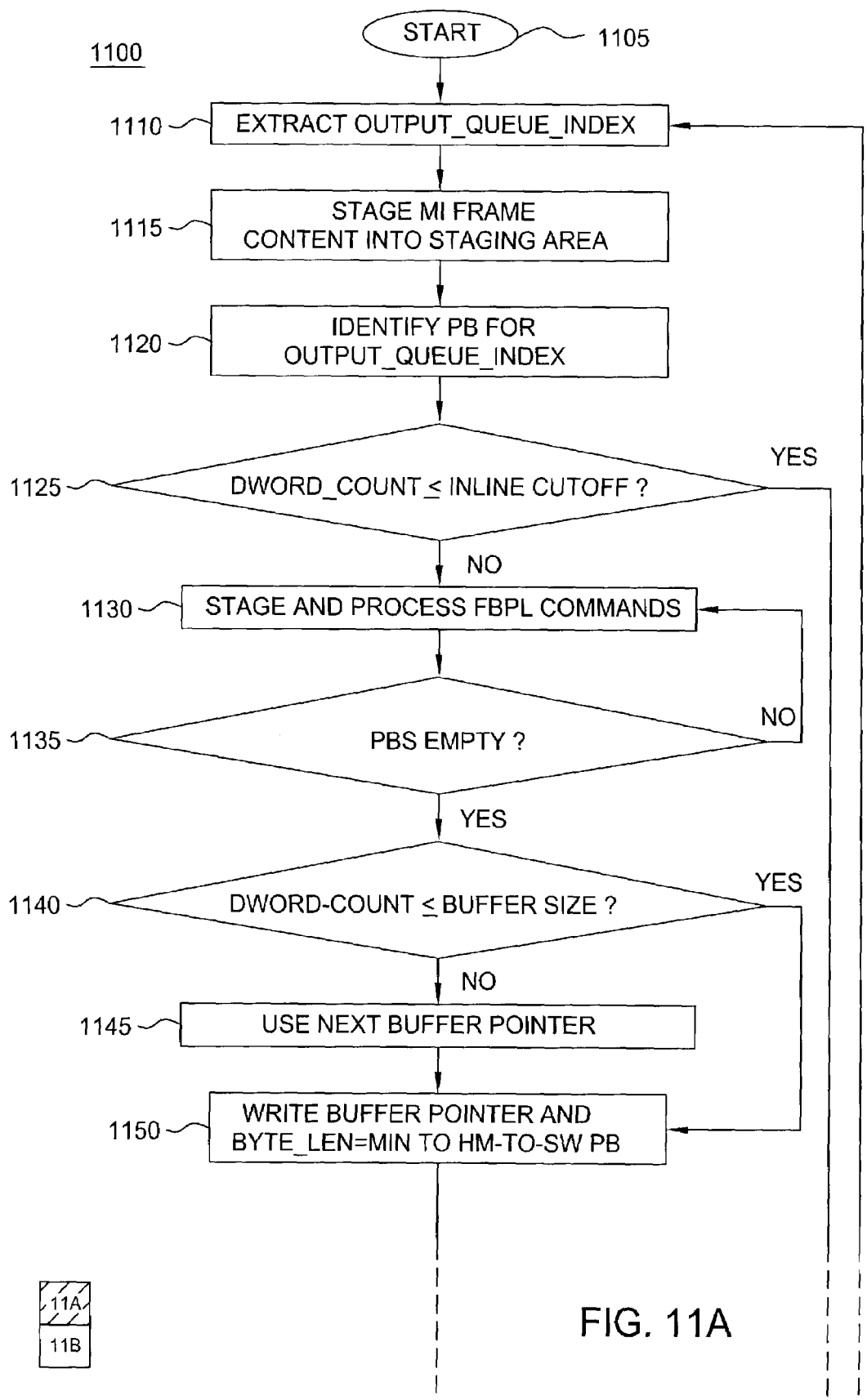
FIG. 11 illustrates a flowchart of a method for transferring frames from the MI to the HM-to-SW push buffers.
Figure 11B:
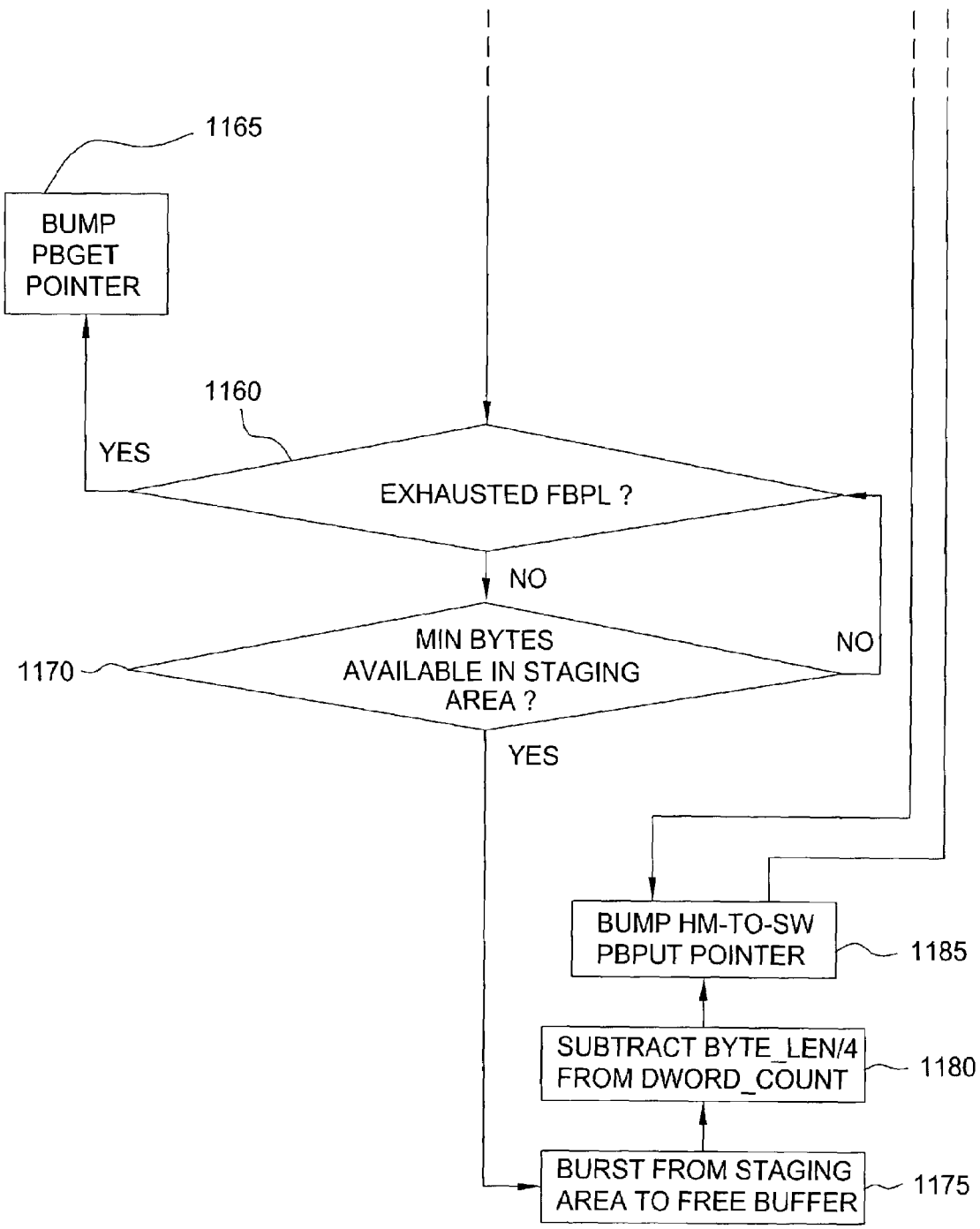

FIG. 11 illustrates a flowchart of a method 1100 for transferring frames from the MI to the HM-to-SW push buffers. Method 1100 starts in step 1105 and proceeds to step 1110.

In step 1110, method 1100 receives the dword_count and CFH from MI for the next frame. Method 1100 extracts the output_queue_index from the CFH and uses this to get the index to the proper HMOPBCTL register.

In step 1115, method 1100 stages the MI frame contents into the output data staging area (HMOCBASE/HMOCMAX priv regs denote range in cache ssram), starting with the CFH. Method 1100 may burst DMA from this staging area to the proper receive buffer area.

In step 1120, method 1100 identifies the PB that is used for this output_queue_index from the HMOPBCTL. It will reveal the one or two SW-to-HM free buffer PBs used for this HM-to-SW PB. It may also reveal the inline_cutoff.

In step 1125, method 1100 compares the dword_count in the frame to the inline_cutoff. If the dword_count is less than or equal to the inline_cutoff, then method 1100 writes a FRAME command to the HM-to-SW PB with inline=1 and n=dword_count. Method 1100 simply burst-writes the frame contents from the output data staging area to the HM-to-SW PB. Method 1100 then proceeds to step 1185.

However, if either SW-to-HM free buffer PB is non-empty, and there is no FBPL read in yet, then method 1100 will stage and start processing the FBPL commands in step 1130. This will at least disclose the buffer size for each buffer and the available buffer pointers. The SW must ensure that the first SW-to-HM free buffer PB has the smaller buffers.

In step 1135, method 1100 queries whether both free frame PBs are empty. If the query is positively answered, then method 1100 will pulse the hm2fe_pint signal to FE to alert the driver and will wait for them to be non-empty. Otherwise, method 1100 returns to step 1130.

In step 1140, method 1100 compares the dword_count left in the frame to the smaller free buffer size, assuming that the small free buffer PB is non-empty. If dword_count is less than or equal to this buffer size or the larger free buffer PB is empty, then method 1100 will use the next buffer pointer in the small FBPL in step 1145. Otherwise, use the next buffer pointer in the large buffer PB.

In step 1150, method 1100 writes the buffer pointer and byte_len=min (dword_count*4,free_buff_len) to the HM-to-SW PB and increments n for this FRAME command.

In step 1160, method 1100 queries whether the FBPL is exhausted. If the smaller/larger FBPL is exhausted, then method 1100 will bump the smaller/larger PBGET pointer past the FBPL command in step 1165. This step will inform the SW that all the buffers in that FBPL have been used up and that it should expect to (eventually) find them in an HM-to-SW PB FRAME command.

In step 1170, method 1100 queries whether the min(64*4, byte_len) bytes have become available in the output data staging area. If the query is positively answered, then method 1100 will burst DMA them from the staging area to the free buffer.

In step 1180, method 1100 subtracts the byte_len/4 from dword_count. If dword_count is now zero, then method 1100 writes the FRAME command with inline=0, n, to the HM-to-SW PB before the addr/len scatter pairs.

Finally, in step 1185, method 1100 will bump the HM-to-SW PBPUT pointer past the newly written FRAME command. If the PB was empty, then method 1100 will pulse the hm2fe_pint (PB interrupt) signal to the FE.

Figure 12:
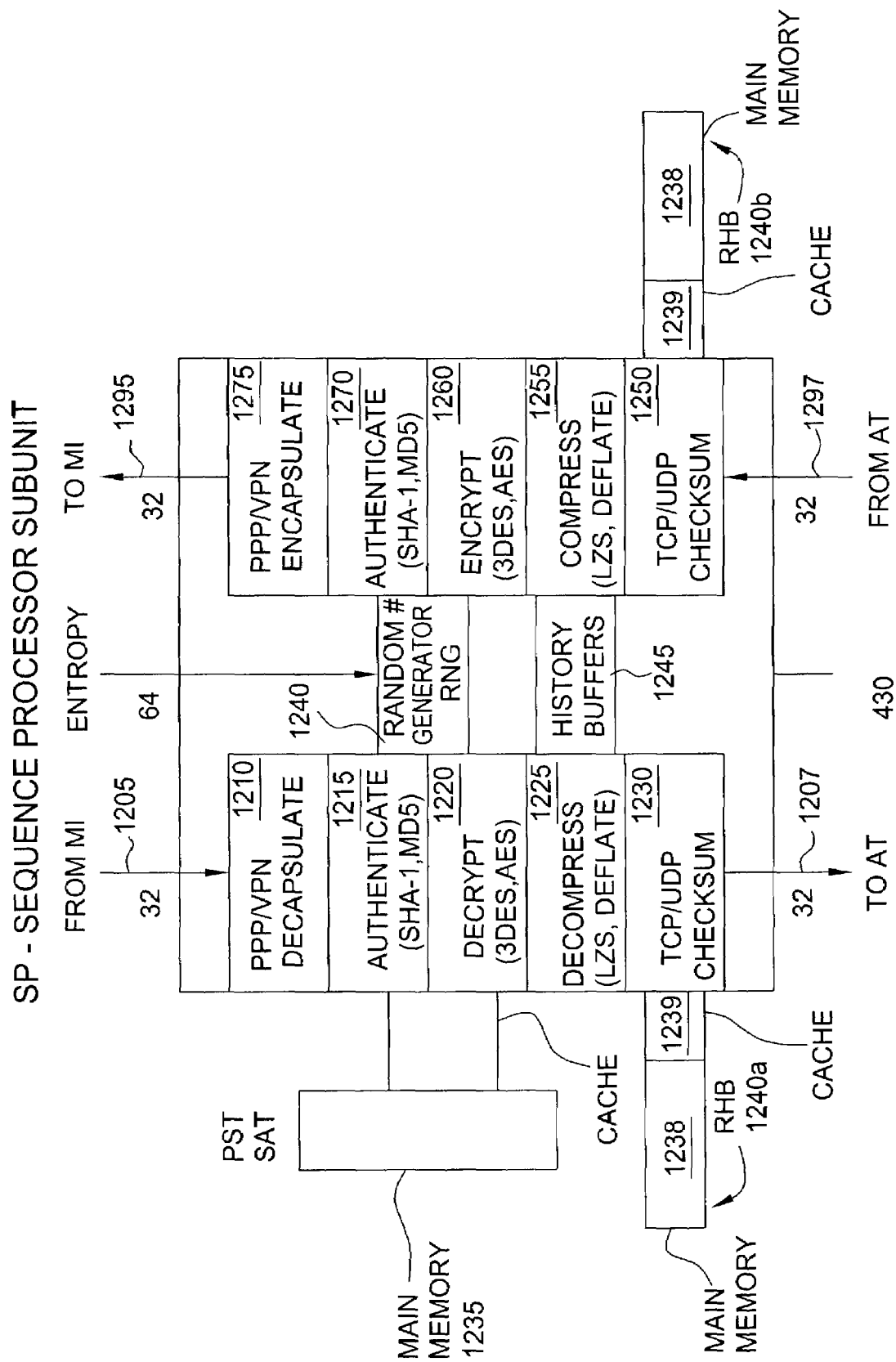
FIG. 12 illustrates a block diagram of the sequence processor subunit of the present invention.

FIG. 12 illustrates a block diagram of the sequence processor (SP) subunit 430 of the present invention. In brief, the SP processes frames from the MI on their way to the AT (pre-AT/input) and from the AT on their way to the MI (post-AT/output). The SP offers a plurality of host controlled functions that Include, but are not limited to IPSec cryptography and authentication, TCP and UDP checksums, IP fragmentation, compression/decompression, PPPoE/PPP, IP encapsulation, and IP reassembly. Moreover, the cryptography component can also be used by the Wi-Fi MAC for 802.11 encryption (RC-4 or AES). Further, the SP will export an interface to a random number generator (RNG) so that the MACs can get random numbers for use in "backoff".

The motivation for grouping various operations into the SP is to keep packet recirculation confined to one subunit. Since the entire packet has to be processed before header values can be updated or authenticated, the packet must recirculate for various functions such as checksums, authentication, and encryption. However, in many cases the operations can be pipelined into a single pass, with the header updates for all operations being applied in the second pass. Since all of these operations may need to be tested closely together, this can now be accomplished in one subunit verification environment with optimal coverage.

Returning to FIG. 12, the SP 430 receives packets on path 1205 from the MI, processes them, and forwards them to the AT on path 1207. Similarly, the SP also receives packets from the AT on path 1297, processes them, and forwards them to the MI on path 1295. These complementary processing sides are referred respectively as the pre-AT side (or overall input side) and post-AT side (or overall output side) side of the SP.

In operation, if the packet arrives from the MI, in one configuration it is processed through the pre-AT side for decapsulation and validation of IP header 1210, authentication 1215, decryption 1220, decompression 1225, and UDP/TCP checksum 1230. If it arrives from the AT, it is processed through the post-AT side for generation of the TCP/UDP checksum 1250, compression, 1255, encryption 1260, generation of authentication values 1270 and encapsulation 1275. However, because the pipeline is configurable, these encryption/decryption and checksum generation/validation can happen either pre-AT or post-AT. Because some of these processing steps are multi-pass or may have to completely process the packet before updating fields that are processed by other steps, recirculation holding buffers (RHBs) 1240a and 1240b are used to store the packet between passes. Similarly, history buffers 1246 are provided for the decompression and compression operations.

Additionally, the SP provides a random number generator (RNG) 1240 to gather entropy bits from the rest of the chip and export the generated random number to the MACs. Finally, the SP also provides multi-level lookup tables, e.g., security association table (SAT) and PST, stored in main memory 1235.

Figure 13:
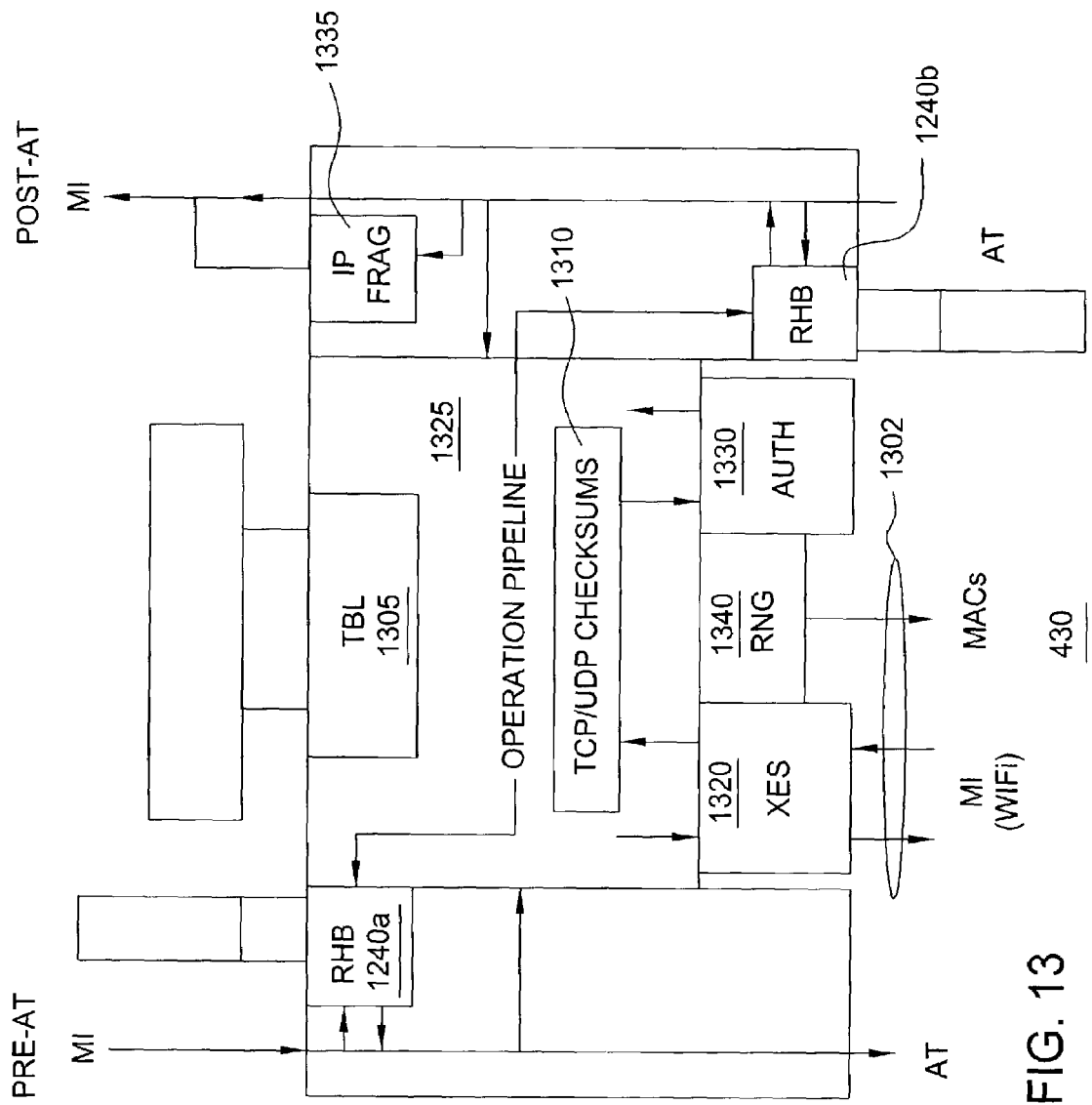
FIG. 13 illustrates a block diagram of the sequence processor (SP) subunit having a common core logic.

In one embodiment, to allow for maximum flexibility the SP implements the core logic for various operations such as cryptography (XES), authentication (AUTH), random number generation (RNG), table lookups (TBL), and checksums as separate logic units that can be pipelined and used by either the pre-AT or post-AT side of the SP. Both the pre-AT and post-AT side of the SP access this group of core logic units as a single block, with the other side of the SP locked out when one side is using the core. However, each side manages its own recirculation holding buffer (RHB) 1240a-b and can decide when to allow a packet to bypass the operation pipeline when no SP operations are required on that side of the pipeline. This simplifies the logic by centralizing the locking, and minimizes area requirements by avoiding duplication of logic and state. This common core approach is illustrated in FIG. 13 below. However, it should be noted that the core logic can still be duplicated, if desired, to meet the requirements of a particular implementation.

FIG. 13 illustrates a block diagram of the sequence processor (SP) subunit 430 having a common core logic. Unlike FIG. 12, both input and output sides of the SP are shown sharing the same core logic and can perform the same sets of operations. In one embodiment, these operations can be divided into transmit side operations (checksum generation 1310, authentication value generation 1330, encryption 1320, and IP fragmentation 1335) and receive side operations (checksum validation 1310, authentication value validation 1330, and decryption 1320). Thus, the modules for cryptography, authentication, and checksums are implemented as part of a central core that can pipeline the output of one module into the input of the next. It should be noted that since both the pre and post-AT sides of the SP use this pipeline, a situation may exist where one side will lock out the other side while using one of the modules.

With the exception of IP fragmentation, all receive and transmit side operations can be performed either pre-AT or post-AT. Consequently, the two sides of the SP 430 look largely the same, with minor differences mostly in the choice of register and header fields that are examined to configure the control logic because of the information available.

For example, when the AT is routing packets, the post-AT side of the SP can determine if the packet is destined for the HOSTMAC. The pre-AT side cannot make this determination. Consequently, the post-AT processing can be more selective and apply receive side operations only to those packets destined for the HOSTMAC.

As noted above, IP fragmentation 1335, remains exclusively an output side operation and is implemented outside of this core block. Consequently, packets requiring only IP fragmentation can be processed in parallel with input side processing.

FIG. 13 also illustrates that the packets can pass directly through the SP to the AT, go directly to the operation pipeline 1325, or await operation pipeline, either in the RHBs 1240a and 1240b or while blocked on the input interface to the SP. Packets that are processed flow into the operation pipeline. The operation pipeline handles looking up security associations in the table stored in cache or memory via the TBL module 1305. It then passes the packet through some permutation of the authentication (AUTH), encryption (XES), and checksum modules before returning to the RHB. The RHB exists in cache with large packets spilling into memory. The packets may then flow out of the RHB to the AT or back into the operation pipeline for further processing.

It should also be noted that the XES 1302 and AUTH 1330 modules use the random number generator (RNG) 1340 to generate keys and initialization vectors. Additionally, FIG. 13 illustrates the XES and RNG modules as been accessible by other subunits via various interfaces 1302. Specifically, the XES module 1320 can be accessed by the MI to provide encryption for wireless packets and the RNG module 1340 can be used by the MACs to randomize their back-off values.

In operation, packets arrive on a 33-bit interface (32 data bits plus 1 bit for end of frame (EOF)) from the AT or the MI. The packet's CFH is examined to determine if SP processing is necessary. The packet may bypass the SP processing entirely by going directly to the next sub-unit (AT or MI). The bypass decision can be made while another frame is being processed on the other side of the SP. However, if the frame available on the input interface cannot bypass the SP, the SP does not read the rest of the frame in until any previous packet for this side of the SP has been forwarded to the next subunit.

When a packet enters the pipeline, the SP parses the headers to determine the operations that need to be applied and configures the pipeline so that the packet passes through the appropriate modules in the appropriate order and begins circulating the packet. If the packet requires IPSec processing, then the setup step includes using the table module (TBL) to do a table lookup in the security association table (SAT) to find the SAT entry (SATE) that applies to this packet. That SATE is cached in a local set of registers. This configuration also includes determining whether the frame requires another pass through the SP or not. In the former case, the RHB must be configured to flow to the operation pipeline on the next read. In the latter case, the RHB must flow to the next subunit on the next read.

The configuration and operation of the pipeline and the modules are further described below. Briefly, a packet requiring receive-side processing may pass through the authentication (AUTH), decryption (XES), and/or the checksum modules. In the most common case these three operations can be pipelined. For transmit-side processing the packet may pass through the checksum generation or possibly a pipeline of encryption and/or authentication. TCP/UDP checksum generation cannot be pipelined with other operations because the generated checksum must be written into the packet header, which requires a second pass through the data. In the most complex case, the frame may be part of an IPSec tunnel, requiring further parsing of the internal headers that are revealed after decryption.

Finally, some of the modules are leveraged by the wireless and miiMACs for encryption and random number generation. Consequently, there are 8-bit input and output interfaces 1302 to the Wi-Fi MAC from the XES module. And, there are interfaces 1302 in the RNG to gather entropy bits from the rest of the chip and export the generated random number to the MACs (for use in random back-offs.)

Although there are separate interface/RHB management units for the pre-AT and post-AT sides of the SP, the behavior is largely similar so that the sides are described together herein. If a frame is currently being transferred to the output interface, this operation takes priority until the frame is complete. This may be a frame being transferred from the RHB or a frame that is bypassing this side of the SP.

The interface management can allow a packet to bypass the SP and simultaneously transfer a frame between the RHB and the operation pipeline (in either direction). Output of the operation pipeline goes to the RHB so there is never contention between a bypass packet and the operation pipeline. Whenever the input interface has data available and isn't blocked, the interface management will peek at the first three dwords of the frame on that interface (from MI for pre-AT and from AT for post-AT) in order to make a bypass decision. If the packet is a bypass packet, it is transferred directly to the output interface (as long as a packet from the RHB isn't currently being transferred to the output interface.) If the packet is not a bypass packet and the SP is currently processing a frame on this side, servicing the input interface is suspended until the current frame is complete. However, if this side of the SP is currently processing no frame, then it is possible to read the frame into either the RHB or the operation pipeline. The behavior is determined by two debug bits: RHB_WHEN_BLOCKED and RHB_ALWAYS. The following table 1 indicates the behavior based on the combination of the bits.

TABLE 1

|  |  | RHB_WHEN_BLOCKED | |
| --- | --- | --- | --- |
|  |  | TRUE | FALSE |
| RHB_ALWAYS | TRUE | Input to RHB | Input to RHB |
|  | FALSE | Feed to pipeline or copy to RHB. | Feed to pipeline or block interface. |

If the RHB_ALWAYS bit is set, the frame always goes to the RHB first. If the RHB_ALWAYS bit is false, then the frame is transferred directly to the operation pipeline if it is available. It should be noted that the post-AT side of the SP gets priority when both sides want access to the core. If the pipeline is not available and the RHB_WHEN_BLOCKED bit is set to true, then the frame is transferred to the RHB. However, if the BUFFER_WHEN_BLOCKED is set to false, then the frame is not read in, and the interface is stalled until the operation pipeline is available to process the packet.

Whenever a packet is received for processing by the operation pipeline, either into the RHB or directly into the operation pipeline, the ethernet header has trailing padding added to make the subsequent headers align on dword boundaries. Similarly, when data is read from the RHB to the output interface, this padding is stripped.

In general, a packet may bypass the SP 430 if no checksum, IPSec, or IP fragmentation is required. As a first filter, any packet that is not an IP packet may bypass the SP. Additionally, IP fragments may bypass the pre-AT SP, but the post-AT SP may have to fragment them further.

In one embodiment, even if a packet may require IPSec or checksum processing, the configuration may optionally indicate the operation should be applied on the other side of the NPU. For frames from an MiiMAC, the SP relies on bits in the SPMACCTL register associated with the input MAC. There are fields for PRE_AT_IPSEC and POST_AT_IPSEC and corresponding fields for checksums. Because the host may recirculate a packet for decryption or checksum validation, receive operations may also come from the host-MAC. To check for these, the SP 430 examines the DIRECTION field in the CFH. If the direction is RECEIVE, the SP also checks corresponding fields in the canonical frame header (CFH). For transmit operations, only the CFH is checked, and only if the direction is TRANSMIT.

One difficult aspect of the bypass decision is to make the decision without looking too far into the packet. That is because looking into the packet requires reading the packet in and buffering it, which is not desirable, especially if there is already a packet in the RHB. To address this issue, the MI and HM peek at the headers of packets as they are processed and record whether or not the packet is an IP fragment (CFH.PROTO3=IP4_FRAG) or if it contains an IPSec payload (CFH.PROTO4==AH or CFH.PROTO4==ESP). The AT also helps by setting a bit in the CFH (CFH.DO_IP-FRAG) if the packet requires IP fragmentation. The information provided by these other subunits accelerates the bypass decision at the SP.

Furthermore, on the pre-AT side of the SP, decisions have to be made without knowing the packet's ultimate destination. Receive side operations (decrypt, validation of authentication and checksums) only need to be applied if the packet is destined for this host. But if pre-AT receive operations are enabled (based on fields in the SPMACCTL register for the input MAC), the SP will assume the packet may be for this host. The SP may also need to apply receive operations on a packet recirculated by the HOSTMAC. In this case, the CFH direction bit will be set to RECEIVE and the GEN_*_CHECKSUM will indicate if checksum validation is required. Additionally, the SECURITY_OP_COUNT field will have all bits set (0x7) if IPSec operations are desired. This value is used because the SP sets the SECURITY_OP_COUNT during receive side operations to indicate the number of operations that were attempted (including partial attempts). Using smaller values of the SECURITY_OP_COUNT to signal that IPSec is desired would leave no way to distinguish between success and a non-attempt.

Moreover, the security op count field indicates the number of SAT indices being passed in the CFH argument fields. For receive operations, there are no arguments being passed in. The SPI values are parsed from the packet headers.

Transmit operations are easier to process. The input MAC will be HOSTMAC, the CFH DIRECTION field will be TRANSMIT, and the SECURITY_OP_COUNT field will be non-zero, if there are IPSec operations that need to be applied. Likewise, the GEN_*_CHECKSUM fields will be set if checksums need to be generated. Finally, it is also possible to allow the packet to bypass if the packet is already marked pass through for some unit beyond this one.

The other operation that occurs outside the operation pipeline is IP Fragmentation. The SP performs IP fragmentation on the post-AT side only, as the frame is leaving the SP. The decision is based on an IP fragment bit in the CFH (set by the AT based on CFH LEN, vs. Ipv4 len.) If the CFH indicates IP fragmentation is required, the MSS field in the CFH will indicate the MTU to use. The MTU should be dword aligned. Otherwise it will be punted to the software for handling.

The interface management module has an interface to the RHB to buffer frames being recirculated through the RHB. Whenever a frame passes through the operation pipeline, it will be written to one of the two Recirculation Holding Buffers (RHBs) 410*a-b* rather than being sent to the AT or MI. There is an RHB for both the input (IRHB) and output (ORHB) sides. Furthermore, when a packet is initially received into the SP, it may be read into an RHB before processing begins. Each RHB can be partially in global cache ssram 1239 and partially in system memory 1238. Typically, the SW will configure the RHBs to be sufficiently large in global cache ssram (e.g., 2 KB each) so that all non-jumbo recirculated packets remain on the chip. Again, priv registers (not shown) are used to define the location and size of the SP IRHB and ORHBs.

The heart of the SP 430 is the operation pipeline 1325. While both the pre-AT and post-AT sides of the SP maintain their own recirculation buffers and include logic to determine if the current frame can bypass the SP or not, the two sides share a single operation pipeline. The operation pipeline checks for request signals from both the pre-AT and post-AT sides of the pipeline and de-asserts the busy signal for one. In one embodiment, if both are waiting, the post-AT side is chosen.

The operation pipeline then receives the frame in and parses the headers. Based on information in the headers, the operation pipeline determines whether this frame needs receive or transmit processing as discussed below.

Specifically, packet processing has two major phases if the frame is not intended for bypass: Configure Pipeline and Pipeline Data. Generally, the operation pipeline parses the headers as it goes, in order to determine what operations to perform. Pipeline output always goes to the RHB. After that pass, the pipeline may be reconfigured based on remaining operations and/or headers revealed due to decryption.

During pipeline configuration, the SP reads in as many of the frame's sub-headers as possible in order to configure as much of the operation pipeline 1325 as possible. As headers are processed, they may be written to the RHB since network and transport headers cannot go into the pipeline until it is fully configured. It should be noted that if encryption is being used, some headers may be inaccessible initially. Configuration may include: getting the SAT entry (if needed), specifying the operations to perform and where the next set of reads from the RHB should go, e.g., to the operation pipeline or to the next subunit.

The data may be pipelined through a receive side pipeline (e.g., decrypting and validating) or a transmit pipeline (e.g., encrypting, and generating checksums or authentication values.) These two pipelines are simply different configurations and orderings of the same modules. Data arriving from an input MAC other than the HOSTMAC will go through receive side processing (if it didn't bypass the SP). For data arriving from the HOSTMAC, the CFH's direction field determines whether the receive or transmit pipeline applies.

Figure 14:
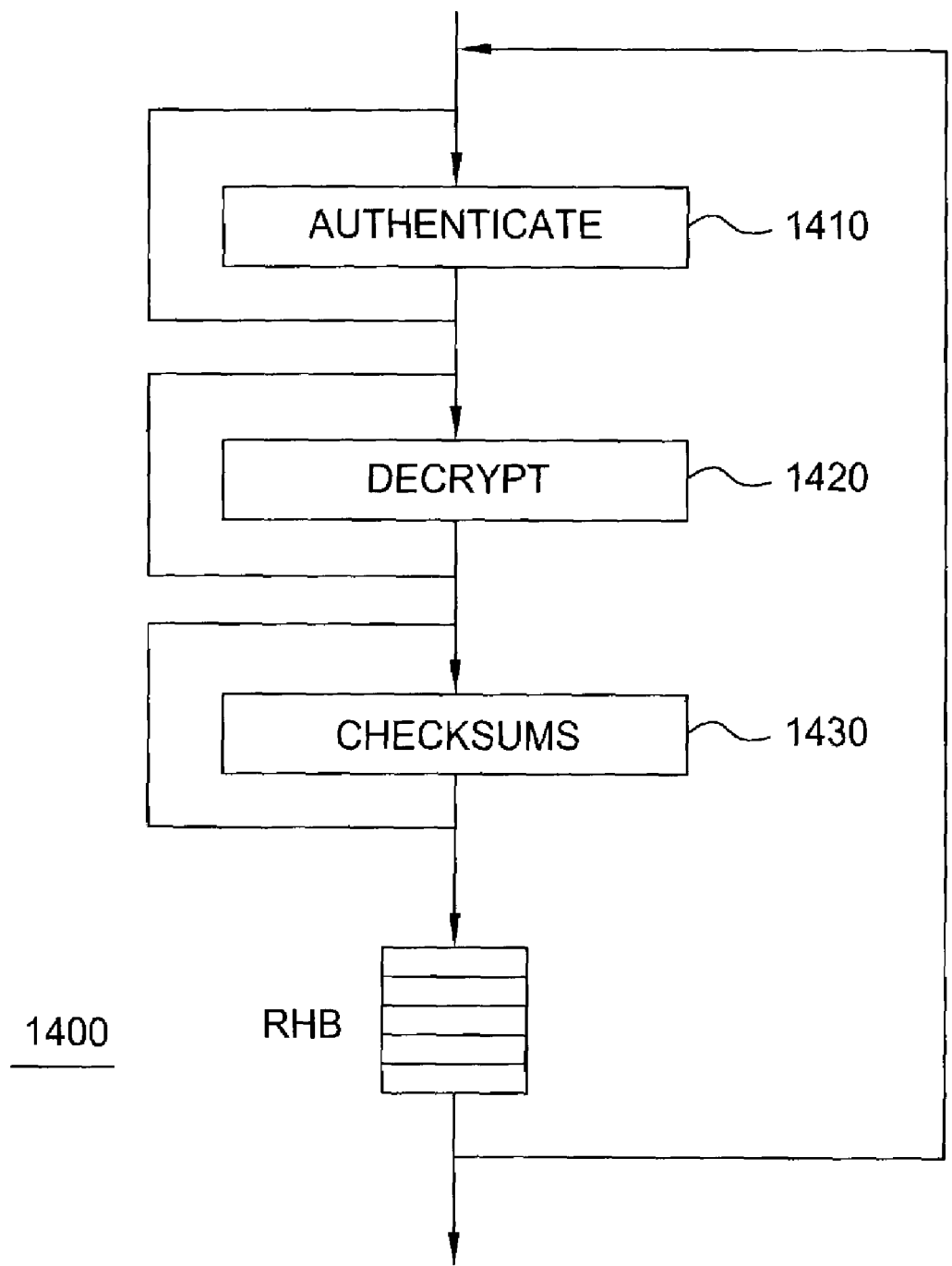
FIG. 14 illustrates a receive pipeline of the sequence processor (SP) of the present invention.

FIG. 14 illustrates a receive pipeline 1400 of the sequence processor of the present invention. This FIG. 14 can also be perceived as a flowchart. Specifically, in one embodiment, the data may be pipelined and recirculated through any or all of 3 operations, authentication 1410, decryption 1420, and checksum 1430, e.g., UDP/TCP.

Possible configurations may include any subset of these two pipelines:
ESP auth→ESP Decrypt→UDP/TCP checksum
AH auth→LESP Decrypt→UDP/TCP checksum Since AH and ESP employ the same authentication unit, the SP will not pipeline AH authentication into ESP authentication. When more than one authentication is required, the results of the first authentication stage must be directed to the RHB. Only the last authentication stage may be pipelined with ESP encryption and/or UDP/TCP checksums. Alternatively, if a particular implementation requires the combination of AH authentication with ESP authentication, then the receive pipeline 1400 of the SP can be deployed with two authentication units.

The configuration of the receive pipe 1400 is as follows:

1) First, the receive pipeline 1400 reads in the CFH and Ethernet header.

2) If the next protocol is IP (either based on PROTO3 or ESP/AH next proto, depending on iteration), then read in the IP header and validate IP header. If there is a problem, the receive pipeline marks as pass through and go to "Receive Operations". This will forward the packet out through a null pipeline. "Receive Operations" is a series of operations that will be described below.

3) If the next protocol is AH or ESP and IPSec is enabled (in SPMACCTL register or CFH field), then the receive pipeline will read in the AH/ESP subheader through SPI value.

4) If the next protocol is UDP or TCP and UDP/TCP checksum is enabled, then the receive pipeline will turn on UDP/TCP checksum as further disclosed below.

5) Otherwise, go to "Receive Operations" without marking the frame PT.

6) Read in the AH/ESP subheader through SPI value.

7) Check for an SAT entry in the MRU that matches the SPI value. If it is not found, request a lookup from the TBL block. The TBL block handles checking cache and memory and following the hash chain, returning only when all possibilities are exhausted or a match is found. If the entry was not found, fill in the passthru reason code of IN_SATE_NOT_FOUND. If CFH.ROUTE is TRUE and this is PRE_AT, do not fill in the pass through before field and go to "Receive Operations". The AT will check the reason field and either clear the field (if the packet is being routed) or mark the packet as passthru (if it is intended for the local host.). If the entry was not found and ROUTE=FALSE or this is POST_AT and the output MAC is HOSTMAC, fill in the pass through reason code and the pass through before field. If an SAT entry was found, but had the ignore bit set, then this packet needs no IPSec processing by this node. Without enabling any pipeline operations, go to "Receive Operations". Otherwise, continue.

8) Use SATE info to configure data going to auth or xes blocks. If authentication for both AH and ESP are necessary and this is the AH pass, do not turn on decryption and do not go back to see if there is something else after this header. Instead, go to "Receive Operations". Return to this step after each sub-iteration to see if decryption should be turned on. If decryption was just turned on, switch to use XES as source for subsequent header and data and go to the next step because the encrypted payload may be TCP/UDP.

9) Finally, turn on UDP/TCP checksum. Save the UDP and TCP checksum values as they go by. At this point, the receive pipeline does not know if the transport protocol is TCP/UDP or otherwise, because ESP stores the next header field in the trailer. Thus, store both and compute the checksum; fix up or disregard the checksum calculation once the actual protocol type is known. Go to "Receive Operations".

Once the receive pipeline 1400 is configured, the data is actually processed by performing the steps of the "Receive Operations". However, before the steps of the Receive Operations are executed, the receive pipeline will note whether ESP is used.

Specifically, when using ESP, it is not possible to tell the protocol type of the encrypted data until reading the next_header field in the ESP trailer. Moreover, the length of the encapsulated packet isn't known until the pad length is read, just before the ESP trailer. If encryption is pipelined with checksums, this means that the checksum computation a) doesn't know if it's computing a UDP or TCP checksum and b) includes the padding and ESP trailing data. To address this issue, the checksum then subtracts out the pad data (by reading the most recent block written to the RHB) and adds in the correct proto4 number.

1) The "Receive Operations" start by reading in input, directing output to the RHB, and processing according to the pipeline configuration. These processing steps are handled by the AUTH module 1410, the XES module 1420, and the Checksum module 1430.

2) After fully processing the packet, the receive pipeline will deconfigure any pipeline operations.

3) If an authentication was in effect, the receive pipeline will verify if it passed. If not, and pipelined with decrypt, the process will go to set up the pipeline for encryption, input from RHB, re-encrypt, and set PT. If it failed, but without decrypt, set PT (i.e., mark for passthru).

If it passed:
If UDP/TCP checksum was in effect, see if it matched and record VALID_CHECKSUM or mark passthru on error.
If decrypt was in effect, be sure it succeeded (no pad length errors). If error, mark passthru.

4) If the receive pipeline just finished an AH authentication only pass, and it was not the last, then return to step 8 of the configure pipeline as disclosed above.

5) Finally, if the IPSec packet is complete and it was the second time or if the next header is not IPv4 or IPv6, then return to step 1 above. Otherwise, go to step 2 of the configure pipeline as disclose above to process a potential inner IPSec packet (or at least to validate the inner IP header.)

Figure 15:
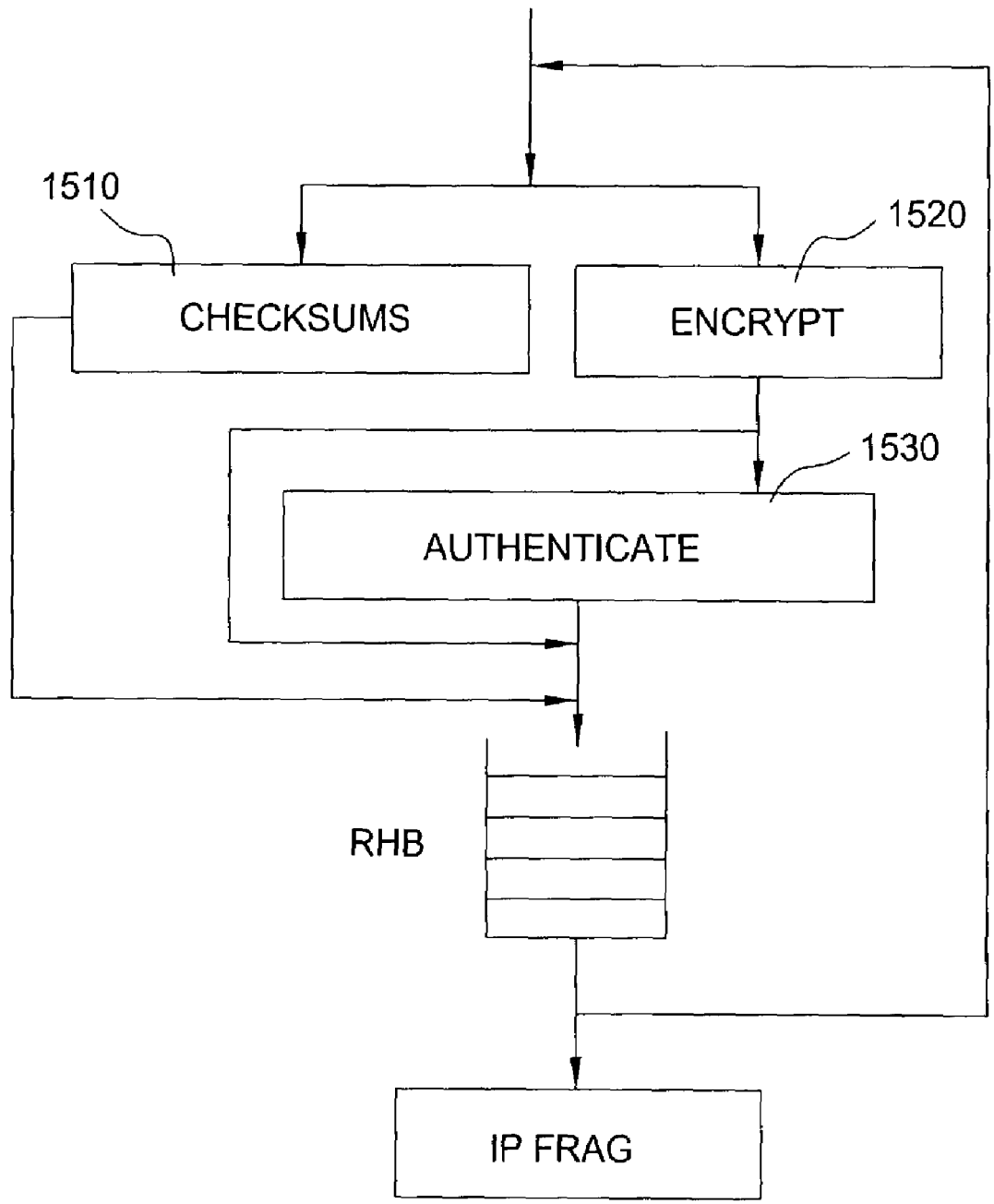
FIG. 15 illustrates a transmit pipeline of the sequence processor (SP) of the present invention.

FIG. 15 illustrates a transmit pipeline 1500 of the sequence processor of the present invention. This FIG. 15 can also be perceived as a flowchart. For the transmit pipeline 1500, the operations applied are the inverse of the receive operations. Moreover, their order is inverted. FIG. 15 illustrates the packets flow and possible recirculation through the pipeline. The inner most protocol (TCP/UDP) must be processed first and the outermost protocol (IP) last. For transmission, the transmit pipeline can only be pipelined through up to 2 operations: encryption 1520 and authentication 1530. UDP/TCP checksums 1510 require a separate pass because the checksum field in the TCP/UDP header must be updated and that field is part of the input to the encryption and authentication stages so the packet must be recirculated before being processed by the encryption or authentication. The operations that have to be performed for a given frame on transmission are determined by fields in the CFH.

Possible configurations may include UDP/TCP checksum and/or any subset of these two pipelines:
ESP Encrypt→ESP auth
ESP Encrypt→AH auth As with receive operations, because AH and ESP use the same authentication unit, pipelining AH authentication into ESP authentication is not possible without providing a duplicate unit. When more than one authentication is required, the results of the first authentication stage must be directed to the RHB. Only the last authentication stage may be pipelined with ESP encryption and/or UDP/TCP checksums.

Transmit pipeline operation proceeds from the inside out. Assuming the PRE_AT flag matches the current side of the SP for each operation, the transmit pipeline configuration method is as follows:

1) All operations that need to be applied can be determined from the CFH, which is generally not processed by the pipeline itself, so the header parsing can be pipelined with the actual receiver operations 2) If CFH.GEN_IP_CHECKSUM, then activate IP header checksum generation and record the IP header(s) and compute their checksums as well. (There may be more than one if an IPSec tunnel is in effect.) Clear the GEN bits at the same time the headers are updated.

3) If CFH.GENERATE_{TCP,UDP}_CHECKSUM, parse the headers down to the inner TCP/UDP header. If there is an inner TCP/UDP header, configure the pipeline to do TCP/UDP checksum and perform "Receive Operations" with output to RHB. Update header checksum value(s) for TCP/UDP and IP and clear the GEN bits.

4) If SECURITY_OP_COUNT>0, then get the argument (SAT index) that applies to the deepest encapsulated header. Check the index against the MRU entry. If it matches, configure the pipeline based on this SAT (continue to the next step). If not found, request a lookup from the TBL block. The TBL block handles checking cache and memory, returning only when all possibilities are exhausted or a match is found. If the entry was not found, fill in the passthru reason code of IN_SATE_NOT_FOUND. Fill in the pass through reason code and the pass through before field. If an SAT entry was found, but had the ignore bit set, then this packet needs no IPSec processing by this node. Without enabling any pipeline operations, go to "Transmit Operations", which a series of data processing steps that will be described below.

5) Use SATE info to configure data going to auth or xes blocks. If authentication for both AH and ESP is required and this is the ESP pass, turn on encryption and AUTH (based on the ESP AUTH data) and go to "Transmit Operations". Return to this step after the sub-iteration to see if AH authentication should be on. If only one AUTH pass is performed, there is no need to return to this step. Decrement SECURITY_OP_COUNT and return to step 4 after this pass.

The "Transmit Operations" steps are as follows:
1) Read in the input and apply the enabled operations with the data flow indicated. These steps are handled by the AUTH 1530, XES 1520, and Checksum 1510 Computation modules.

2) After fully processing the packet, deconfigure any pipeline operations.

3) If this was the checksum pass, return to step 40 of the Transmit Pipeline configuration above.

4) If an ESP authentication pass is just finished and an AH authentication remains, return to step 40 of the Transmit Pipeline configuration. Otherwise, done. NOTE: If ESP introduces padding that changes the IP packet length, the header length field and checksum must be adjusted. (At this point we assume the driver automatically leaves room for the padding necessary with ESP.)

SP executes the following method to validate an IP header. Note that the offsets and lengths of particular fields will change between IPv6 and IPv4. Furthermore, the external information that is used to double check this protocol layer will change depending on whether it is a tunnel or transport IP.

1) If this is the outer IP header, assume CFH0 PROTO3 is IPv4 or IPv6. If this is the inner header, assume the next header field of the previous header is IPv4 or IPv6.

2) Check length fields (using dword_count passed from MI for outer IP, or using a computed value of the packet based on payload values of encapsulating protocols minus headers and padding.)

3) If IPv4, calculate header checksum, skipping over the mutable fields.

4) If IPv6, scan the extension headers to find the offset to the first IPSec, TCP/UDP, or IP header.

5) If any problems with above, then pass-through frame to error output MAC given in SPCTL register.

The checksum computation is performed in the main operation pipeline module 1325. Since the transport protocol may not be known until the tail of the packet is processed (ESP trailer), a checksum is actually computed for every packet that passes through the SP. However, the computed value is discarded if the packet is not a TCP or UDP packet.

If the pipeline is configured to compute checksums, then the checksum is computed as the data passes through the pipeline. TCP and UDP checksum computations are processed the same up until a fix-up step at the end. This is efficient and it allows the process to handle the situation where the type of the packet is not known until the ESP next header field is processed, which is inside the encrypted trailer of the ESP packet. The disclosure below details which fields are examined. Note that this assumes the network transport protocol is IPv4. For IPv6, the pseudo-header has to include IPv6 addresses.

The SP computes the TCP/UDP checksum using the following method.

1) Using offsets recorded when parsing the header, read the available fields of the UDP/TCP pseudo header (Source IP address, destination IP address, zero byte, 8-bit protocol value, and 16-bit UDP/TCP length). The protocol value and length will be filled in after the entire packet is processed. Likewise, the checksum value from the real header will be removed from the computation at the end. For now, record the values at the offsets where the UDP and TCP checksums would be. Pass the rest of the packet through, one dword at a time. Record the actual checksum value and use a zero for the UDP checksum value while computing.

2) Compute a running checksum, passing output to the next stage of the pipeline.

3) If the checksum being computed was encrypted in an ESP packet, some of the bytes processed may have been padding. It is necessary to back up to the beginning of the padding and subtract out those values in order to get an accurate checksum. (Note that this step of backing up does not require a recirculation or access to memory outside the SP as those pad bytes from the end of the packet should still be in the RHB.)

4) If the protocol type is UDP, use the UDP offsets and subtract the UDP checksum, and add the UDP length and protocol type (0x17) to the checksum. Or, if the protocol type is TCP, use the TCP offsets and subtract the TCP checksum, and add the TCP length (computed based on packet length minus the padding) and protocol type (0x6) to the checksum. Otherwise, this packet is neither TCP or UDP, so skip checksum test and go to end. If validating checksums, perform step 5. If generating checksums, perform step 6.

5) If checksums match, prepare to set the VERIFIED_*_CHECKSUM value in the CFH on next circulation. If the checksums do not match, set the CFH PT_REASON field to *_BAD_CHECKSUM and set PT_BEFORE to PT_BEFORE_MI_OUTPUT. Go to end.

6) Generate a write to the RHB/memory to record the computed checksum value in the packet.

Another unique aspect of the present NPU is the ability to provide random numbers. Specifically, In one embodiment, random number generation in the SP examines a set of entropy bits for change, and concatenates those that have changed since the last sampling with the collected entropy bits of prior cycles.

To illustrate, when 12 dwords of entropy have been collected, or when some part of the SP or MAC needs a random value, the random module whitens the random number by passing it through one of the authentication algorithms (MD-5 or SHA) to permute the bits. This means pushing a 128-bit key (the low 128 bits of the previous authentication cycle) and the 12 dwords to the AUTH module. (If less than 12 dwords are available, send what is available and let the AUTH module handle getting a block less than 512 bits. SHA produces a 160-bit value and MD-5 produces a 128-bit value. In either case, the lower 128 bits are saved. The lower 64 bits are returned as the random number. All 128 bits are saved and used as the key for the next whitening pass. The top 64 bits are treated as a secret key. Moreover, the low bit of the secret key determines whether the next whitening should be MD5 (1), or SHA (0).

To address MiMACs requesting random number, the method distributes a 64 bit random to the 4 MACs in 16 bit chunks. The MACs will cache the value for future use. Basically, the only change is that the request/busy signal may be multiplexed from one of the MACs instead of exclusively from within the SP.

Figure 16:
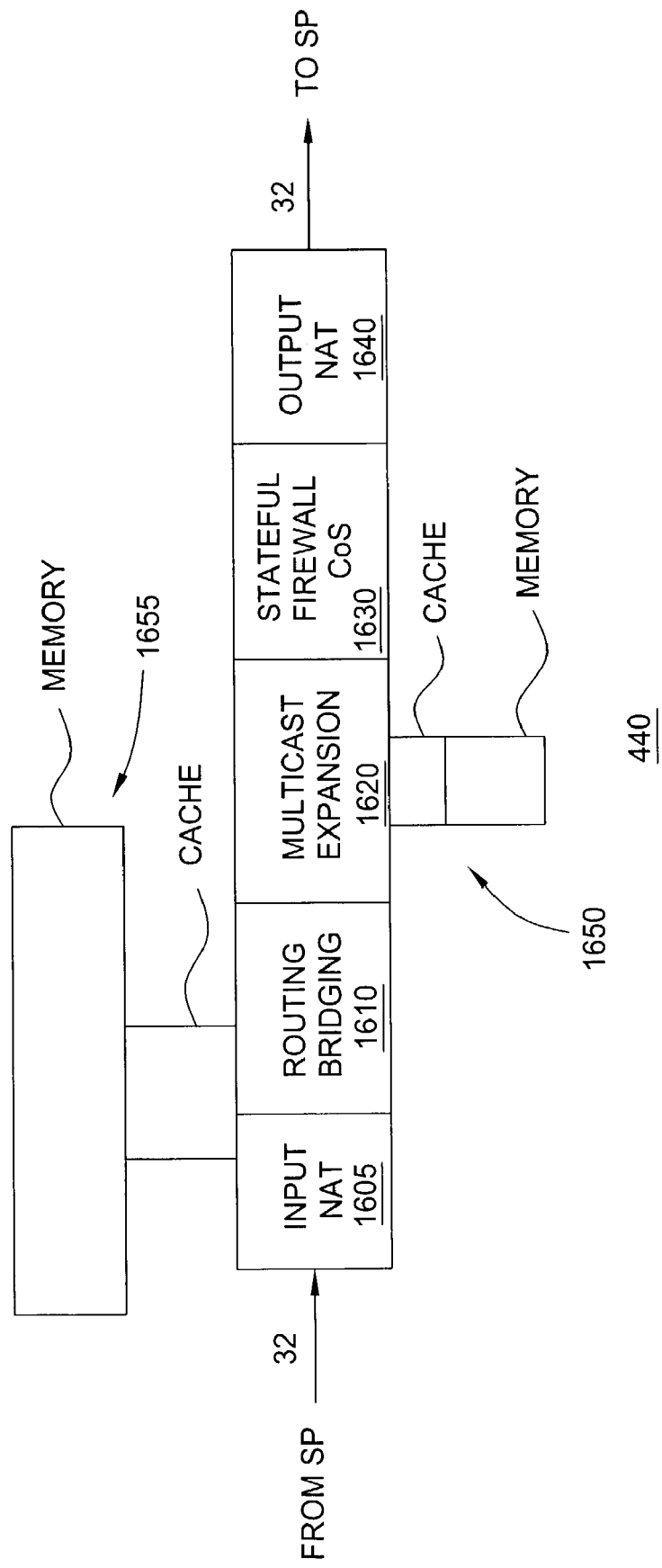
FIG. 16 illustrates a block diagram of the address translation subunit 440 of the present invention.

FIG. 16 illustrates a block diagram of the address translation (AT) subunit 440 of the present invention. Specifically, the AT subunit of the NPU performs NATing (1605, 1640), bridging 1610, routing 1610, multicasting 1620 and firewalling 1630. The AT Unit of the NPU provides software-configured hardware to accelerate the network communications of a four-port switch, router and gateway, thereby providing acceleration of bridging, routing, firewalling, NATing and multicasting operations. To assist in these AT operations, buffers 1650 and 1655 are provided, where a portion of each buffer is implemented in ssram and the remaining portion is implemented in main memory.

In operation, the AT subunit receives a packet from the SP and determines whether the incoming interface is running a Network Address Translator (NAT). If the query is positively answered, then the AT subunit will perform inbound NAT filtering.

Next, the AT subunit determines whether the MAC destination address matches the MAC address associated with a particular interface. If the MAC destination address matches, then the packet is routed (provided that the hardware supports such routing). If the hardware does not support such routing, the packet is punted to the software for handling.

If the MAC destination address does not match the MAC address associated with a particular interface, then the packet is bridged by looking up the MAC destination in ART and storing ART index in xCFH.

If the packet is determined by the AT subunit to be part of a multicast-base application, the packet is then multicasted in accordance with the multicast destination address.

Next, the AT subunit firewalled connections for the packet are tracked in accordance with a Firewall Connection table.

Finally, the AT subunit will perform outbound NAT filtering. For example, if the AT subunit detects that the outgoing interface is NAT enabled, then the NTv4_index is stored into the xCFH.

Figure 17:
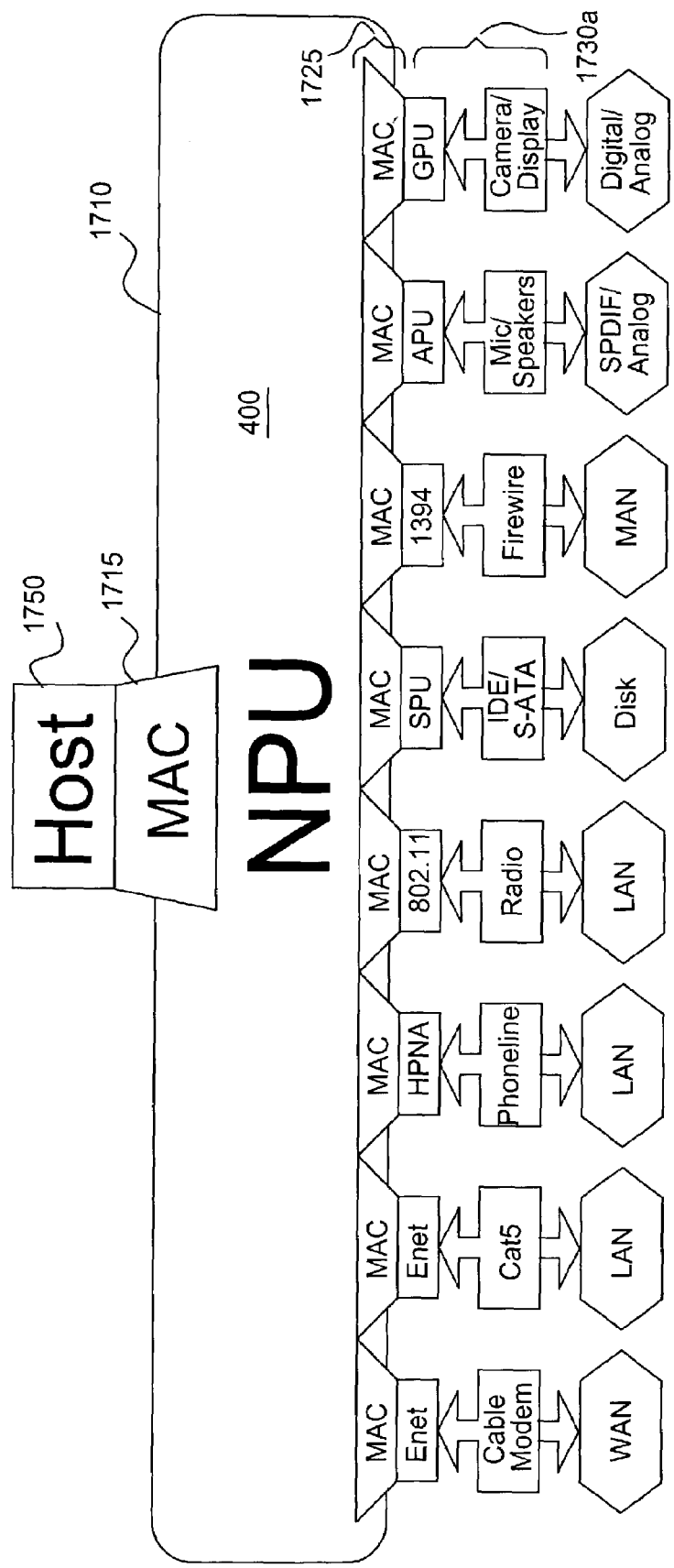
FIG. 17 illustrates a block diagram where a host computer's resources are networked via a network processing unit of the present invention.

FIG. 17 illustrates a block diagram where a host computer's resources are networked via a network processing unit 400 of the present invention. Specifically, a host 1750 communicates with the NPU 400 via a MAC 1715 (i.e., a host MAC). In turn, a plurality of XPUs and other host resources 1730a are connected to the NPU via a plurality of MACs 1725 that interface with a MAC Interface (MI) (not shown) of the NPU.

Figure 18:
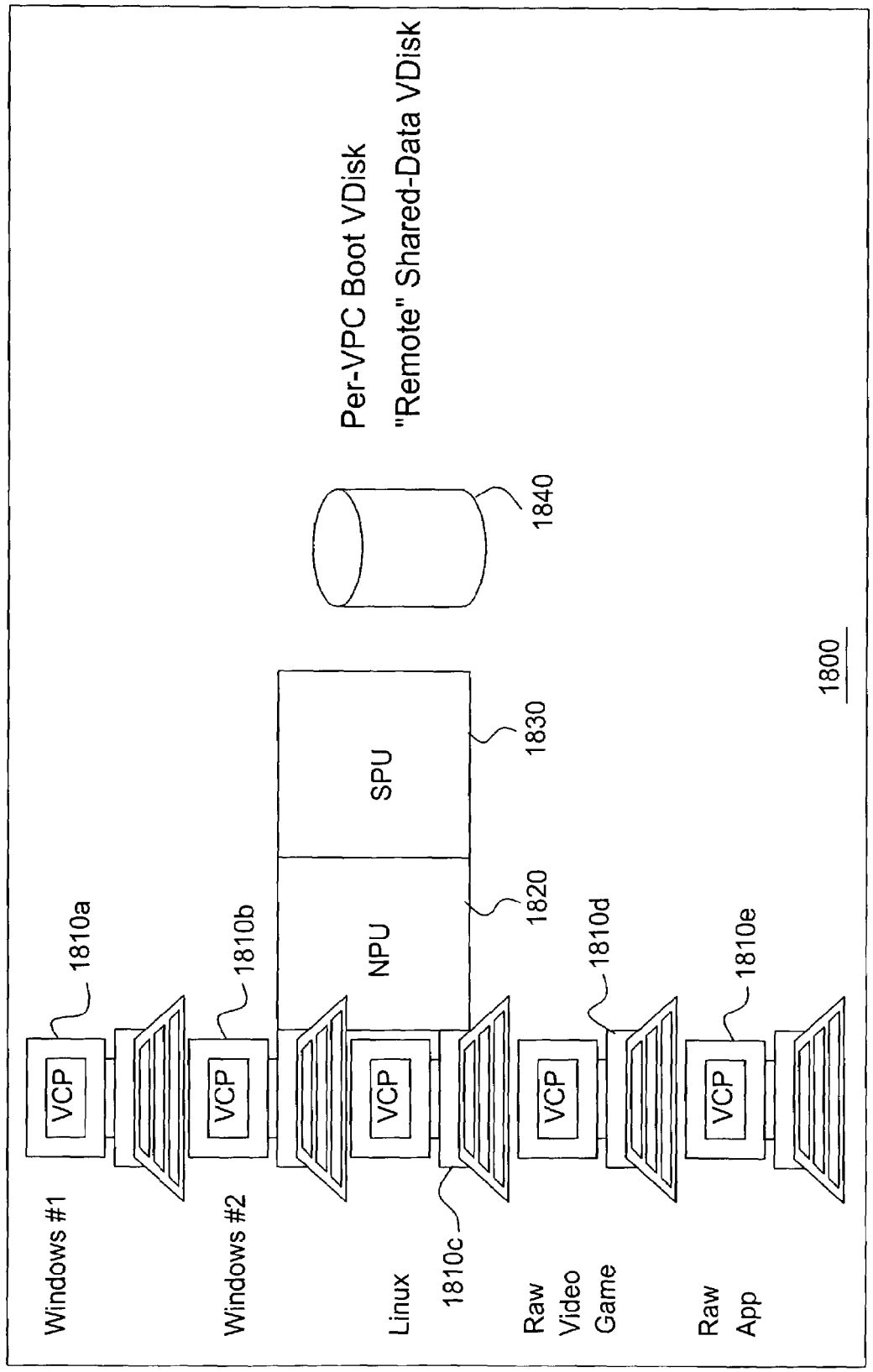
FIG. 18 illustrates a block diagram of a network of virtual personal computers in communication with a network processing unit of the present invention.

FIG. 18 illustrates a block diagram of a network of virtual personal computers or virtual hosts that are in communication with a network processing unit 1820 of the present invention. More specifically, FIG. 18 illustrates a network of virtual personal computers (VPCs) in a single system (or a single chassis) 1800, where the system may be a single personal computer, a set top box, a video game console or the like.

In operation, FIG. 18 illustrates a plurality of virtual hosts 1810a-e, which may comprise a plurality of different operating systems (e.g., Microsoft Corporation's Windows (two separate copies 1810a and 1810b), and Linux 1810c), a raw video game application 1810d or other raw applications 1810e, where the virtual hosts treat the storage processing unit 1830 as a remote file server having a physical storage 1840. In essence, one can perceive FIG. 18 as illustrating a "network of VPCs in a box".

In one embodiment, the NPU 1820 manages multiple IP addresses inside the system for each VPC. For example, the NPU 1820 may be assigned a public IP address, whereas each of the VPCs is assigned a private IP address, e.g., in accordance with Dynamic Host Configuration Protocol (DHCP). Thus, each of the VPCs can communicate with each other and the SPU using standard networking protocols.

It should be understood that the XPUs of the present invention can be implemented as one or more physical devices that are coupled to the host CPU through a communication channel. Alternatively, the XPUs can be represented by one or more software applications (or even a combination of software and hardware, e.g., using application specific integrated circuits (ASIC)), where the software is loaded from a storage medium, (e.g., a ROM, a magnetic or optical drive or diskette) and operated in the memory of the computer. As such, the XPUs (including associated methods and data structures) of the present invention can be stored on a computer readable medium, e.g., ROM or RAM memory, magnetic or optical drive or diskette and the like.

Although various embodiments which incorporate the teachings of the present invention have been shown and described in detail herein, those skilled in the art can readily devise many other varied embodiments that still incorporate these teachings. In the claims, elements of method claims are listed in a particular order, but no order for practicing of the invention is implied, even if elements of the claims are numerically or alphabetically enumerated.

What is claimed is:

1. A network processing apparatus, said apparatus comprising:
   a host central processing unit (CPU);
   a system memory;
   a media access controller interface (MI) subunit for communicating with at least one media access controller (MAC) to serve as an input and output point for traversal of packets, and to provide an asynchronous boundary interface between a first clock domain of said MAC and a second clock domain of said media access controller interface (MI) subunit;
   a host media access controller (HM) for communicating with said media access controller interface (MI) subunit and said host CPU to address packet processing events, wherein said host media access controller (HM) accesses a plurality of push buffers that are stored in system memory to transfer commands or data between said HM and said host CPU;
   a sequence processor (SP) that is coupled to the MI and configured to provide automatic decapsulations, decryption, authentication, checksums, and decompression for input packets and compression, checksums, authentication, encryption and encapsulations for output packets; and
   an address translation module that is coupled to the SP and configured to perform routing and stateful firewall functions.

2. The apparatus of claim 1, wherein said packet processing events include both router packet processing and host packet processing.

3. The apparatus of claim 1, wherein said plurality of push buffers are organized into at least one buffer pair with one input buffer for storing input commands or data and one output buffer for storing output commands or data.

4. The apparatus of claim 3, wherein said at least one buffer pair of push buffers is used for interfacing with an operating system of said host CPU.

5. The apparatus of claim 3, wherein said at least one buffer pair of push buffers is used for routing packets.

6. The apparatus of claim 3, wherein said at least one buffer pair of push buffers is used for bridging packets.

7. The apparatus of claim 3, wherein said at least one buffer pair of push buffers is used for interfacing with an external media access controller (MAC).

8. The apparatus of claim 1, wherein said plurality of push buffers are organized into at least one triplicate set of push buffers, with one input buffer for storing input commands or data, one output buffer for storing output commands or data and one buffer for storing commands relating to at least one available free buffer.

9. The apparatus of claim 1, wherein said SP is configured to generate random numbers.

10. The apparatus of claim 1, further comprising a first software driver configured to manage communications between said host CPU and said MI for host packet processing.

11. The apparatus of claim 10, further comprising a second software driver configured to manage communications between said MI and other processing units in said network processing system for router packet processing.

12. The apparatus of claim 10, wherein said first software driver selects one push buffer from said plurality of push buffers by detecting how many of said plurality of push buffers that are allocated to store commands or data for consumption by said MI are not empty to produce non-empty push buffers and determining a priority of each non-empty push buffer.

13. Method for providing a network processing unit, said method comprising the steps of:
   providing a host central processing unit (CPU);
   providing a system memory;
   providing a media access controller interface (MI) subunit for communicating with at least one media access controller (MAC) to serve as an input and output point for traversal of packets, and to provide an asynchronous boundary interface between a first clock domain of said MAC and a second clock domain of said media access controller interface (MI) subunit; and providing a host media access controller (HM) for communicating with said media access controller interface (MI) subunit and said host CPU to address packet processing events, wherein said host media access controller (HM) accesses a plurality of push buffers that are stored in system memory to transfer commands or data between said HM and said host CPU;

providing a sequence processor (SP) that is coupled to the MI and configured to provide automatic decapsulations, decryption, authentication, checksums, and decompression for input packets and compression, checksums, authentication, encryption and encapsulations for output packets; and providing an address translation module that is coupled to the SP and configured to perform routing and stateful firewall functions.

14. The method of claim 13, wherein said packet processing events include both router packet processing and host packet processing.

15. The method of claim 13, wherein said plurality of push buffers are organized into at least one buffer pair with one input buffer for storing input commands or data and one output buffer for storing output commands or data.

16. The method of claim 15, wherein said at least one buffer pair of push buffers is used for interfacing with an operating system of said host CPU.

17. The method of claim 15, wherein said at least one buffer pair of push buffers is used for routing packets.

18. The method of claim 15, wherein said at least one buffer pair of push buffers is used for bridging packets.

19. The method of claim 15, wherein said at least one buffer pair of push buffers is used for interfacing with an external media access controller (MAC).

20. The method of claim 13, wherein said plurality of push buffers are organized into at least one triplicate set of push buffers, with one input buffer for storing input commands or data, one output buffer for storing output commands or data and one buffer for storing commands relating to at least one available free buffer.

21. The method of claim 20, wherein said at least one buffer pair of push buffers is used for interfacing with an operating system of said host CPU.

22. The method of claim 20, wherein said at least one buffer pair of push buffers is used for routing packets.

23. The method of claim 20, wherein said at least one buffer pair of push buffers is used for bridging packets.

24. The method of claim 20, wherein said at least one buffer pair of push buffers is used for interfacing with an external media access controller (MAC).

25. The method of claim 13, wherein said SP is configured to generate random numbers.

26. The method of claim 13, further comprising the step of providing a first software driver that is configured to manage communications between said host CPU and said MI for host packet processing.

27. The method of claim 26, further comprising the step of providing a second software driver that is configured to manage communications between said MI and other processing units in said network processing system for router packet processing.

28. The method of claim 26, wherein said first software driver selects one push buffer from said plurality of push buffers by detecting how many of said plurality of push buffers that are allocated to store commands or data for consumption by said MI are not empty to produce non-empty push buffers and determining a priority of each non-empty push buffer.

\* \* \* \* \*